(12) United States Patent
Kaizu et al.

(10) Patent No.: US 9,124,809 B2
(45) Date of Patent: *Sep. 1, 2015

(54) IMAGE PROCESSING APPARATUS, IMAGE PICKUP APPARATUS, IMAGE PROCESSING METHOD, AND PROGRAM

(71) Applicant: Sony Corporation, Tokyo (JP)

(72) Inventors: Shun Kaizu, Tokyo (JP); Tomoo Mitsunaga, Kanagawa (JP); Yasushi Saito, Saitama (JP); Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,212

(22) Filed: Jun. 30, 2014

(65) Prior Publication Data

US 2014/0313400 A1 Oct. 23, 2014

Related U.S. Application Data

(62) Division of application No. 13/457,774, filed on Apr. 27, 2012, now Pat. No. 8,803,985.

(30) Foreign Application Priority Data

May 13, 2011 (JP) ................................. 2011-108047

(51) Int. Cl.
  *H04N 5/235* (2006.01)
  *H04N 5/355* (2011.01)
  *G06T 5/00* (2006.01)

(52) U.S. Cl.
  CPC ........... *H04N 5/2353* (2013.01); *H04N 5/2355* (2013.01); *H04N 5/3559* (2013.01); *H04N 5/35554* (2013.01); *H04N 5/35581* (2013.01)

(58) Field of Classification Search
  CPC ......... H04N 5/228; H04N 5/235; H04N 3/14; H04N 5/355–5/3559; G06K 9/00; G06K 9/32; G06T 5/007–5/009; G06T 2207/20208
  USPC ............. 348/222.1, 221.1, 302, 229.1, 208.4, 348/307, 208.99, 362; 382/107, 162, 294
  See application file for complete search history.

(56) References Cited

U.S. PATENT DOCUMENTS 6,720,993 B1 * 4/2004 Hwang et al. ............ 348/208.13
8,040,411 B2 10/2011 Nakajima et al.
(Continued)

FOREIGN PATENT DOCUMENTS

EP 1 689 164 A1 8/2006
JP 02-174470 A 5/1990
(Continued)

*Primary Examiner* — Tuan Ho
*Assistant Examiner* — Marly Camargo
(74) *Attorney, Agent, or Firm* — Wolf, Greenfield & Sacks, P.C.

(57) ABSTRACT

There is provided an image processing apparatus including an HDR (High Dynamic Range) processing unit inputting images picked up while exposure control that changes an exposure time is being carried out with a predetermined spatial period and a predetermined temporal period on pixels that compose an image sensor, and carrying out image processing. The HDR processing unit generates a first combined image by combining pixel values of a plurality of images with different sensitivities generated by an interpolation process using a plurality of consecutively picked-up images, generates a second combined image by combining pixel values of a plurality of images with different sensitivities generated by an interpolation process that uses a single picked-up image, and generates an HDR image by executing a pixel value blending process on the first combined image and the second combined image in accordance with a blending ratio calculated in accordance with movement detection information.

10 Claims, 43 Drawing Sheets

(56) References Cited

U.S. PATENT DOCUMENTS

| | | | |
|---|---|---|---|
| 8,803,985 B2* | 8/2014 | Kaizu et al. | 348/208.4 |
| 2005/0045980 A1* | 3/2005 | Guidash | 257/432 |
| 2005/0140804 A1* | 6/2005 | Adams et al. | 348/254 |
| 2007/0285526 A1 | 12/2007 | Mann et al. | |
| 2009/0091645 A1* | 4/2009 | Trimeche et al. | 348/273 |
| 2010/0053346 A1 | 3/2010 | Mitsunaga | |
| 2010/0309333 A1* | 12/2010 | Smith et al. | 348/230.1 |
| 2011/0063483 A1* | 3/2011 | Rossi et al. | 348/294 |
| 2012/0287294 A1 | 11/2012 | Kaizu et al. | |

FOREIGN PATENT DOCUMENTS

| | | |
|---|---|---|
| JP | 07-095481 A | 4/1995 |
| JP | 11-075118 A | 3/1999 |
| JP | 2006-253876 A | 9/2006 |
| WO | WO 2006-049098 A1 | 5/2006 |

* cited by examiner

LOW SENSITIVITY PIXELS
(SHORT EXPOSURE TIME)

HIGH SENSITIVITY PIXELS
(LONG EXPOSURE TIME)

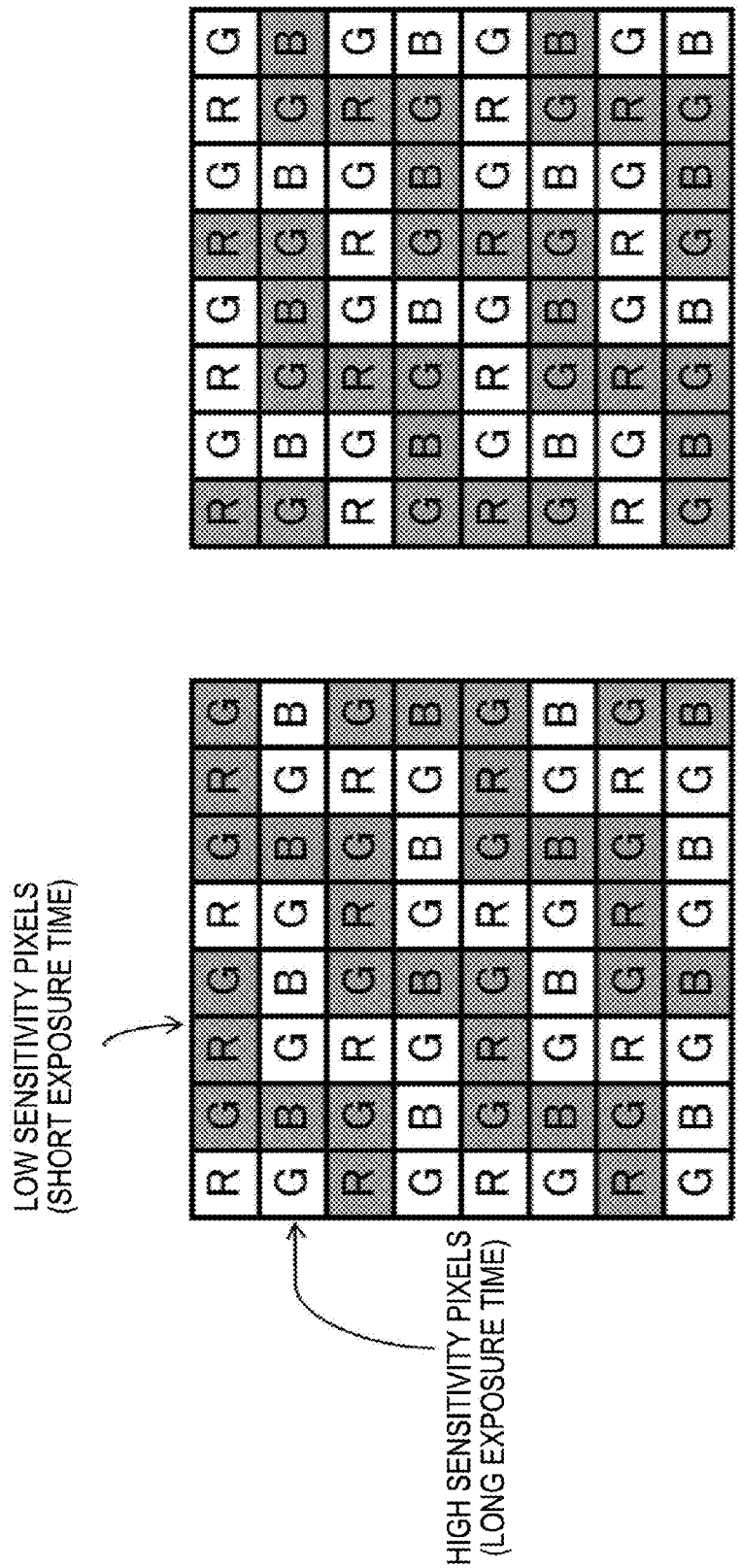

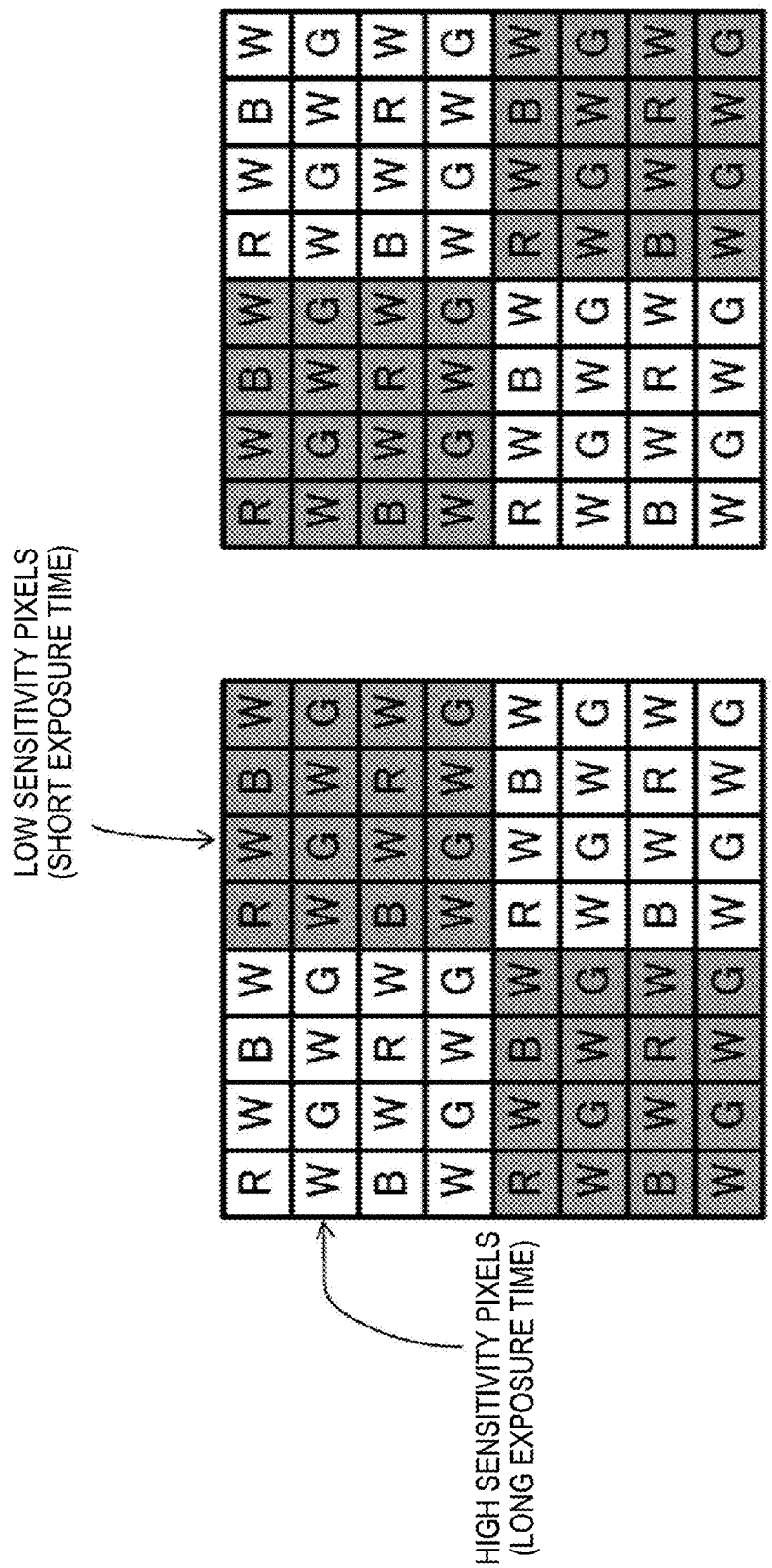

LOW SENSITIVITY PIXELS
(SHORT EXPOSURE TIME)

HIGH SENSITIVITY PIXELS
(LONG EXPOSURE TIME)

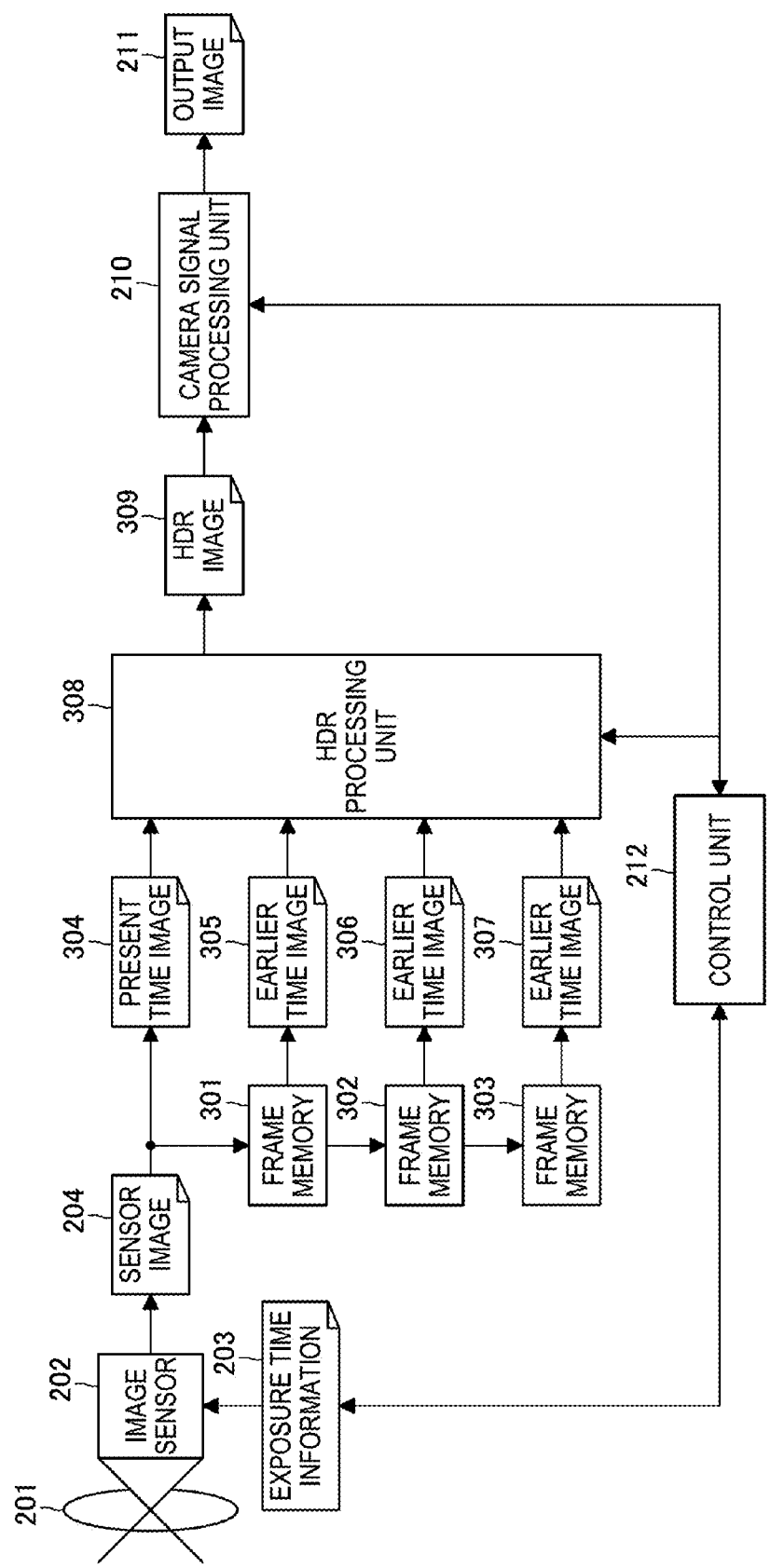

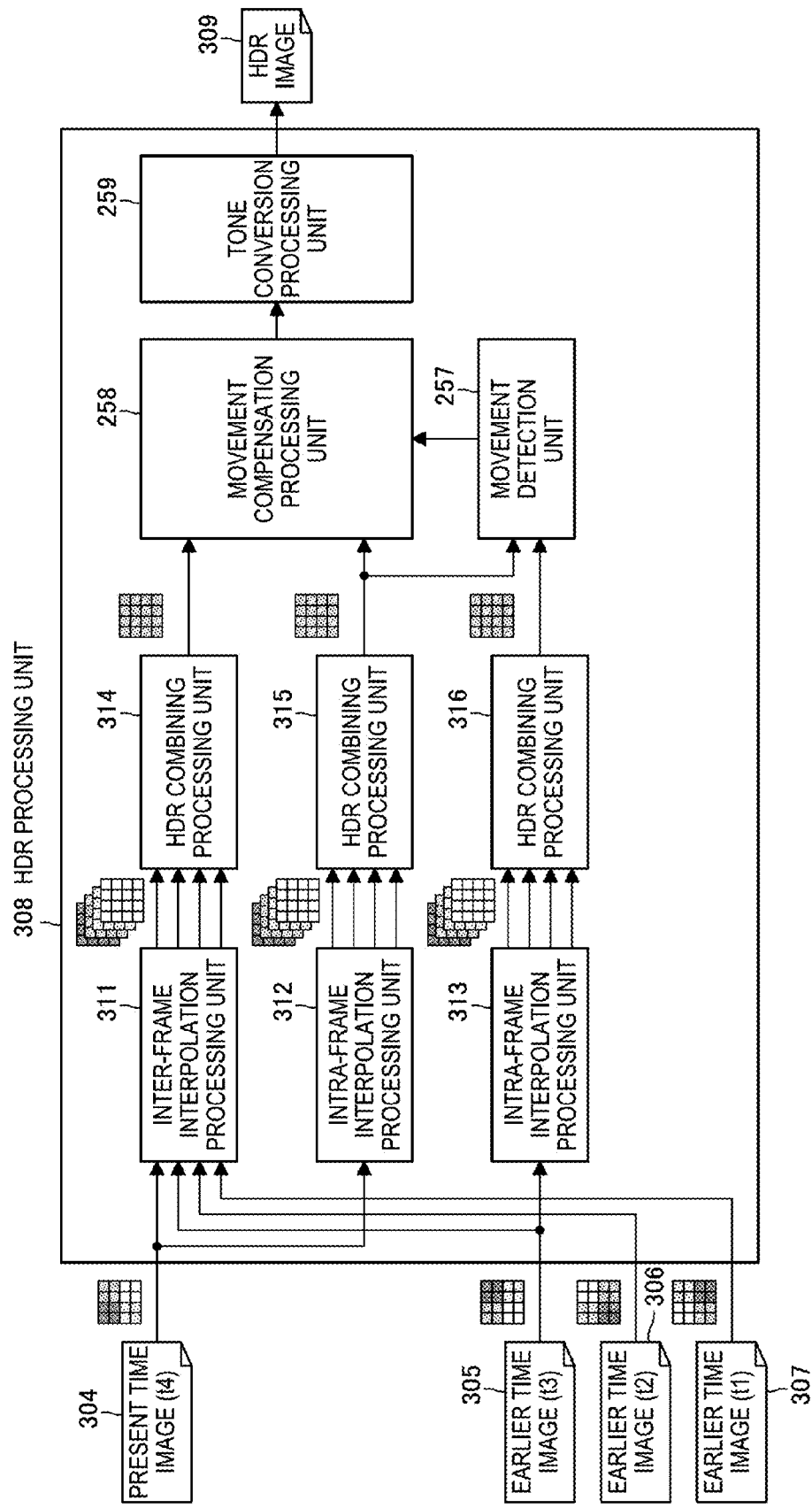

FIG.32A LAYOUT OF PICKED-UP PIXELS

FIG.32B LAYOUT OF OUTPUT PIXELS

FIG.33
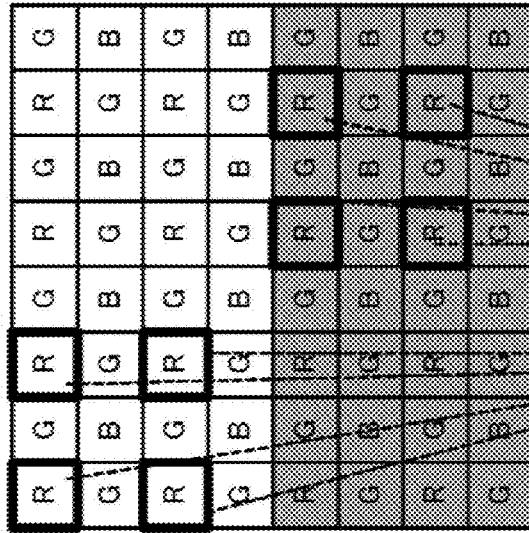
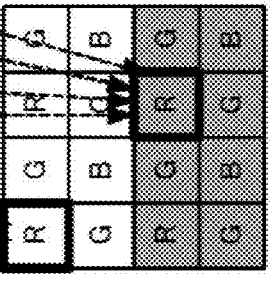
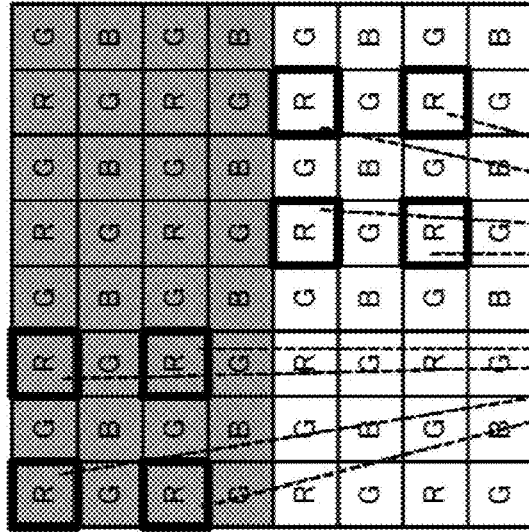
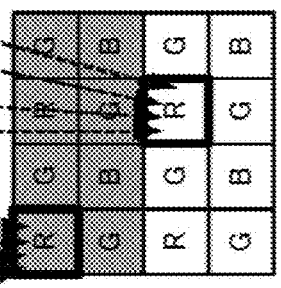

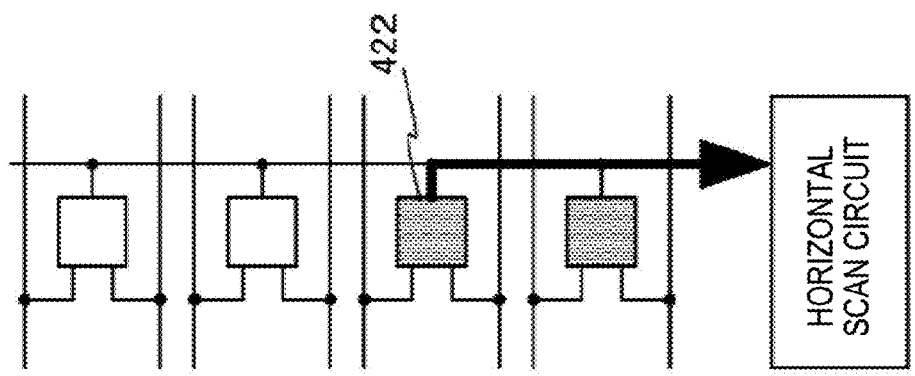
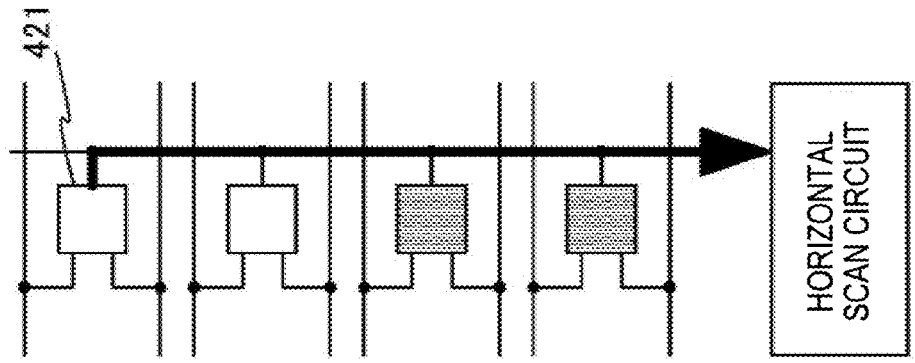

FIG.38
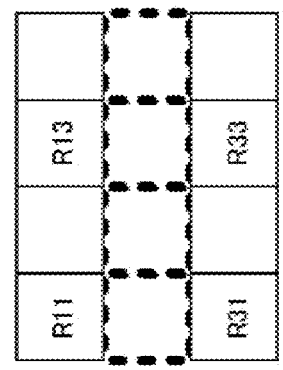
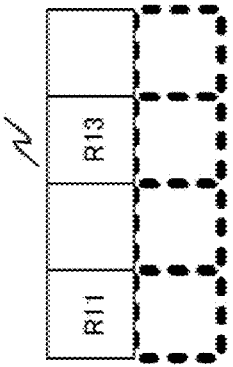
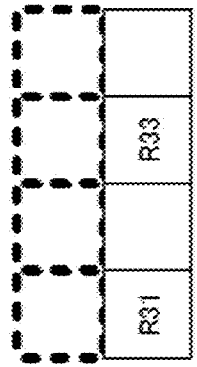

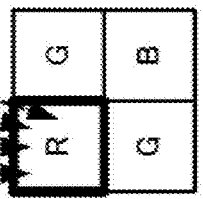
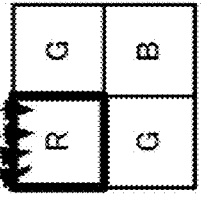
FIG.41

IMAGE PROCESSING APPARATUS, IMAGE PICKUP APPARATUS, IMAGE PROCESSING METHOD, AND PROGRAM

CROSS REFERENCES TO RELATED APPLICATIONS

This application is a divisional of and claims the benefit under 35 U.S.C. §120 of U.S. patent application Ser. No. 13/457,774, titled "IMAGE PROCESSING APPARATUS, IMAGE PICKUP APPARATUS, IMAGE PROCESSING METHOD, AND PROGRAM," filed on Apr. 27, 2012, which claims the benefit under 35 U.S.C. §119 of Japanese Patent Application JP 2011-108047, filed on May 13, 2011. The entire contents of these applications are hereby incorporated by reference in their entireties.

BACKGROUND

The present disclosure relates to an image processing apparatus, an image pickup apparatus, an image processing method, and a program. In particular, the present disclosure relates to an image processing apparatus, an image pickup apparatus, an image processing method, and a program that generate images with a high dynamic range (wide dynamic range).

A solid-state image pickup element such as a CCD image sensor or a CMOS (Complementary Metal Oxide Semiconductor) image sensor used in a video camera or a digital still camera carries out photoelectric conversion by accumulating charge in keeping with the amount of incident light and outputting an electrical signal corresponding to the accumulated charge. However, there is a limit on the amount of charge that can be accumulated in a photoelectric conversion element, so that when a certain amount of light has been received, a saturation level is reached, resulting in regions of a subject with a certain brightness or higher being set at a saturation luminance level, a problem referred to as "blown out highlights" or "clipping".

To prevent clipping, processing is carried out to control the charge accumulation period of the photoelectric conversion element in accordance with the luminance or the like of the subject to adjust the exposure length and thereby optimize sensitivity. For example, by using a high shutter speed to shorten the exposure length for a bright subject, the charge accumulation period of the photoelectric conversion element is reduced and an electrical signal is outputted before the amount of accumulated charge reaches the saturation level. By carrying out such processing, it is possible to output an image in which tones are correctly reproduced for the subject.

However, if a high shutter speed is used when photographing a subject in which both bright and dark regions are present, the exposure length will not be sufficient for the dark regions, which will result in deterioration in the S/N ratio and a fall in image quality. To correctly reproduce the luminance levels of bright regions and dark regions in a photographed image of a subject that includes both bright and dark regions, it is necessary to use a long exposure for pixels on the image sensor where there is little incident light to achieve a high S/N ratio and to carry out processing to avoid saturation for pixels with large amounts of incident light.

One known method of realizing such processing is to consecutively pick up a plurality of images with different exposure lengths and then combine such images. That is, a long-exposure image and a short-exposure image are separately and consecutively picked up and a combining process that uses the long-exposure image for dark image regions and the short-exposure image for bright image regions where clipping would occur for the long-exposure image is carried out to produce a single image. In this way, by combining a plurality of images with different exposures, it is possible to produce images with a high dynamic range with no clipping.

The above type of photography with a high dynamic range is referred to as "HDR" (High Dynamic Range) or "WDR" (Wide Dynamic Range) photography.

A number of existing technologies for realizing HDR photography will now be described.

As described in Japanese Laid-Open Patent Publication Nos. H02-174470, H07-95481, and H11-75118 and in Orly Yadid-Pecht and in Eric R. Fossum, "Wide Intrascene Dynamic Range CMOS APS Using Dual Sampling", IEEE Transactions On Electron Devices, Vol. 44-10, pp. 1721-1723, 1997, for example, one method of generating an HDR image is to pick up a plurality of images with different sensitivities and then combine such images. An example of the configuration and the processing of an image pickup apparatus that uses this method will now be described with reference to FIGS. 1 and 2.

Incident light inputted into an image sensor (image pickup element) 102 via a lens 101 of the image pickup apparatus shown in FIG. 1 is subjected to photoelectric conversion to output a sensor image 103. The sensor image 103 is stored in a frame memory 104. During image pickup, the image pickup apparatus consecutively picks up two images, a high sensitivity image 105 produced by a long exposure and a low sensitivity image 106 produced by a short exposure, stores the two images in the frame memory 104, and inputs the two images into an HDR processing unit 107 located downstream.

The HDR processing unit 107 combines the high sensitivity image 105 produced by the long exposure and the low sensitivity image 106 produced by the short exposure to generate a single HDR image 108. After this, a camera signal processing unit 109 subjects the HDR image 108 to the signal processing carried out in a typical camera, such as white balance adjustment, gamma correction, and a demosaicing process, to generate an output image 110.

The processing sequence of such processing will now be described with reference to FIG. 2. In FIG. 2, the generation timing of the various images listed below is shown on a time axis that advances from left to right.

(a) Output timing of sensor images 103
(b) Output timing of low sensitivity images 106
(c) Output timing of high sensitivity images 105
(d) Output timing of HDR images 108

At time t1, a low sensitivity image#1 is picked up and outputted from the image sensor 102. At time t2, a high sensitivity image#2 is picked up and outputted from the image sensor 102. After this, at t3, t4, . . . , low sensitivity images and high sensitivity images are alternately picked up.

At time t3, the low sensitivity image#1 and the high sensitivity image#2 that have been picked up are outputted from the frame memory 104 to the HDR processing unit 107, and by carrying out a combining process for the two images, a single HDR image "#1, #2" is generated. After this, at time t5, the low sensitivity image#3 and the high sensitivity image#4 that have been picked up are outputted from the frame memory 104 to the HDR processing unit 107, and by carrying out a combining process for the two images, a single HDR image "#3, #4" is generated.

In this way, a low sensitivity image with a short exposure and a high sensitivity image with a long exposure are picked up in alternate frames, images are accumulated in the frame memory, and an HDR image is generated by signal processing. One problem with this method is that since the two images to be combined are picked up at slightly different timing, false colors and double images can be produced when the subject moves.

As another problem, since it is necessary to combine a plurality of images, for video, the frame rate after image combining is lower than the frame rate of the sensor. In the example shown in FIG. 2, since an HDR image is generated from two images, the frame rate for HDR images is half the frame rate of the sensor.

Putting this another way, to output HDR images with the same frame rate as before, the image sensor needs to be driven at twice the speed, which results in an increase in cost and/or an increase in power consumption.

Other methods of generating an HDR image that differ to the method of combining two picked-up images described above are the configurations disclosed for example in Japanese Laid-Open Patent Publication No. 2006-253876, Japanese Patent Publication No. 2006-542337 (Japanese Patent No. 4689620) and Jenwei Gu et al, "Coded Rolling Shutter Photography: Flexible Space-Time Sampling", Computational Photography (ICCP), 2010. Instead of using a long exposure image and a short exposure image that are picked up consecutively, such methods generate an HDR image based on a single picked-up image.

One example of where the exposure time of the image pickup element is set differently in pixel units is when image pickup is carried out by setting long exposure pixels and short exposure pixels in a single picked-up image. The pixel values of the long exposure pixels and the pixel values of the short exposure pixels included in such single picked-up image are used to generate a single HDR image. Examples of the configuration and the processing of an image pickup apparatus that uses this method will now be described with reference to FIGS. 3 to 5.

Incident light inputted into an image sensor (image pickup element) 112 via a lens 111 of the image pickup apparatus shown in FIG. 3 is subjected to photoelectric conversion to output a sensor image 113. The exposure time of the image sensor (image pickup element) 112 is controlled in pixel units according to control by a control unit, not shown, to set long exposure pixels and short exposure pixels in a single image. The sensor image 113 is inputted into an HDR processing unit 114.

The HDR processing unit 114 combines high sensitivity pixels, which are the long exposure pixels and low sensitivity pixels, which are the short exposure pixels, included in the single picked-up image to generate a single HDR image 115. As a specific example, a pixel value combining process is carried out where the pixel values of high sensitivity pixels are selectively used for pixels where the high sensitivity pixels that are the long exposure pixels are not saturated, and the pixel values of low sensitivity pixels in the vicinity are used for pixels where the high sensitivity pixels are saturated. After this, a camera signal processing unit 116 subjects the HDR image 115 to the signal processing carried out in a typical camera, such as white balance adjustment, gamma correction, and a demosaicing process, to generate an output image 117.

Note that as shown in FIG. 4 for example, low sensitivity pixels and high sensitivity pixels are disposed on the image sensor 112 in a repeating pattern. With this setting, it is possible to generate an HDR image from a single image without using two images.

FIG. 5 shows a sequence of such processing. In FIG. 5, the generation timing of the various images listed below is shown on a time axis that advances from left to right.

(a) Output timing of sensor images 113
(b) Output timing of HDR images 115

At time t1, the sensor image #1 is outputted from the image sensor 112. At time t2, the sensor image #2 is outputted from the image sensor 112. After this, at t3, t4, . . . , sensor images are successively outputted. The respective sensor images are images in which low sensitivity pixels and high sensitivity pixels are set.

The sensor image 113 is inputted immediately into the HDR processing unit 114 and the HDR image 115 is generated with almost no delay. As a specific example, a signal is transferred in line units, and therefore only a delay equivalent to the signal of one line is generated. Unlike the configuration described earlier, this configuration is capable of generating an HDR image from one picked-up image frame. Accordingly, a frame memory such as that shown in FIG. 3 is no longer needed and there is also no drop in the frame rate.

However, this method has the following problem. For example, when the subject of image pickup is bright, the high sensitivity pixels included in the single picked-up image will be saturated and it will be necessary to generate an image using only the low sensitivity pixels. Conversely, when the subject is dark, a large amount of noise will be included in the low sensitivity pixels and it will be necessary to generate an image using the pixel information of only the high sensitivity pixels. In this way, there are cases where valid pixel information cannot be obtained due to the state of the image pickup subject, and as a result, there is the problem of a drop in image quality, such as a drop in resolution and/or production of false colors due to the inability to obtain color samples.

SUMMARY

One embodiment of the present disclosure aims to provide an image processing apparatus, an image pickup apparatus, an image processing method, and a program that generate an image with a high dynamic range and are capable of preventing a drop in frame rate and a drop in image quality.

Another embodiment of the present disclosure spatially and temporally controls the sensitivities of pixels of an image sensor. Such aspect aims to provide an image processing apparatus, an image pickup apparatus, an image processing method, and a program that carry out signal processing on an image sensor output image having considered the spatial and temporal periods to realize high dynamic range image pickup with no drop in frame rate or drop in resolution.

According to a first embodiment of the present disclosure, there is provided an image processing apparatus including an HDR (High Dynamic Range) processing unit inputting images that have been picked up while exposure control that changes an exposure time is being carried out with a predetermined spatial period and a predetermined temporal period on pixels that compose an image sensor, and carrying out image processing. The HDR processing unit generates a first combined image by combining pixel values of a plurality of images with different sensitivities generated by an interpolation process using a plurality of images that have been picked up consecutively, generates a second combined image by combining pixel values of a plurality of images with different sensitivities generated by an interpolation process that uses a single picked-up image, and generates an HDR (high dynamic range) image by executing a pixel value blending process on the first combined image and the second combined image in accordance with a blending ratio calculated in accordance with movement detection information.

According to an embodiment of the image processing apparatus of the present disclosure, the HDR processing unit generates the HDR image by executing the pixel value blending process where the blending ratio of the second combined image is raised for a pixel position where the movement detection information shows that there has been movement and the blending ratio of the first combined image is raised for a pixel position where the movement detection information shows that there has been no movement.

According to an embodiment of the image processing apparatus of the present disclosure, the HDR processing unit includes an inter-frame interpolation processing unit generating a plurality of images of different sensitivities by using, without amendment, a plurality of pixels of different sensitivities present in a plurality of images that were picked up consecutively, and the HDR processing unit generates the first combined image by combining pixel values of the plurality of images of different sensitivities generated by the inter-frame interpolation processing unit.

According to an embodiment of the image processing apparatus of the present disclosure, the image processing apparatus further includes a movement detecting unit generating the movement detection information by comparing pixel values of corresponding pixels in images picked up at different times and carrying out movement detection in pixel units, and a movement compensation processing unit generating a HDR image by executing a pixel value blending process for the first combined image and the second combined image in accordance with a blending ratio calculated in accordance with the movement detection information.

According to an embodiment of the image processing apparatus of the present disclosure, the movement detecting unit generates the movement detection information by carrying out movement detection in pixel units based on an image comparison of the second combined image generated by combining pixel values of a plurality of images of different sensitivities generated by an interpolation process that uses only a present time image that is a latest image out of a plurality of images picked up consecutively, and a third combined image generated by combining pixel values of a plurality of images of different sensitivities generated by an interpolation process that uses only an earlier time image that is an image picked up before the latest image out of the plurality of images picked up consecutively.

According to an embodiment of the image processing apparatus of the present disclosure, the image processing apparatus further includes a tone conversion processing unit inputting the HDR image generated by the HDR processing unit and reducing the number of bits of pixel values in the HDR image.

According to a second embodiment of the present disclosure, there is provided an image processing apparatus including an HDR (High Dynamic Range) processing unit inputting images that have been picked up while exposure control that changes an exposure time is being carried out with a predetermined spatial period and a predetermined temporal period on pixels that compose an image sensor, and carrying out image processing. The HDR processing unit includes an intra-frame interpolation processing unit generating a plurality of images of different sensitivities by carrying out an interpolation process that uses a single picked-up image, and an HDR combining processing unit generating an HDR image by carrying out a combining process for the plurality of images of different sensitivities generated by the intra-frame interpolation processing unit.

According to a third embodiment of the present disclosure, there is provided an image pickup apparatus comprising an image sensor, a control unit carrying out exposure control that changes an exposure time with a predetermined spatial period and a predetermined temporal period on pixels that compose the image sensor, and an HDR (high dynamic range) processing unit inputting an image picked up by the image sensor and carrying out image processing. The HDR processing unit generates a first combined image by combining pixel values of a plurality of images with different sensitivities generated by an interpolation process that uses a plurality of images that have been picked up consecutively, generates a second combined image by combining pixel values of a plurality of images with different sensitivities generated by an interpolation process that uses a single picked-up image, and generates an HDR (high dynamic range) image by executing a pixel value blending process on the first combined image and the second combined image in accordance with a blending ratio calculated in accordance with movement detection information.

According to an embodiment of the image pickup apparatus of the present disclosure, the control unit carries out control over the exposure time in line units for the image sensor and carries out different exposure control in units of picked-up image frames.

According to an embodiment of the image pickup apparatus of the present disclosure, the control unit carries out control over the exposure time in line units by controlling line reset timing as a charge accumulation start time for the pixels that compose the image sensor.

According to an embodiment of the image pickup apparatus of the present disclosure, the image pickup apparatus generates the HDR image by carrying out a pixel number reduction process to produce an image with a lower number of pixels than a number of pixels that compose the image sensor and outputting the image produced by the pixel number reduction process to the HDR processing unit.

According to a fourth embodiment of the present disclosure, there is provided an image processing method carried out by an image processing apparatus comprising inputting images that have been picked up while exposure control that changes an exposure time is being carried out with a predetermined spatial period and a predetermined temporal period on pixels that compose an image sensor and carrying out image processing using an HDR (High Dynamic Range) processing unit. The image processing sep generates a first combined image by combining pixel values of a plurality of images with different sensitivities generated by an interpolation process using a plurality of images that have been picked up consecutively, generates a second combined image by combining pixel values of a plurality of images with different sensitivities generated by an interpolation process that uses a single picked-up image, and generates an HDR (high dynamic range) image by executing a pixel value blending process on the first combined image and the second combined image in accordance with a blending ratio calculated in accordance with movement detection information.

According to a fifth embodiment of the present disclosure, there is provided a program causing an image processing apparatus to carry out image processing, comprising image processing carried out by an HDR (High Dynamic Range) processing unit that inputs images that have been picked up while exposure control that changes an exposure time is being carried out with a predetermined spatial period and a predetermined temporal period on pixels that compose an image sensor, The image processing step generates a first combined image by combining pixel values of a plurality of images with different sensitivities generated by an interpolation process using a plurality of images that have been picked up consecutively, generates a second combined image by combining pixel values of a plurality of images with different sensitivities generated by an interpolation process that uses a single picked-up image, and generates an HDR (high dynamic range) image by executing a pixel value blending process on the first combined image and the second combined image in accordance with a blending ratio calculated in accordance with movement detection information.

Note that the program in accordance with the present disclosure is a program that can be provided to an information processing device or a computer system that can execute various program codes, for example, by means of a storage medium provided in a computer-readable format or a communication medium. When such a program is provided in a computer-readable format, a process in accordance with the program is implemented on the information processing device or the computer system.

The objects, features, and advantages of the present disclosure will become apparent from the following embodiments of the present disclosure and the detailed description made based on the accompanying drawings.

According to the embodiments of the present disclosure described above, an apparatus and method that generate a high-quality, high dynamic range image based on picked-up images is realized.

More specifically, an image processing (HDR processing) unit inputting images that have been picked up while exposure control that changes an exposure time is being carried out with a predetermined spatial period and a predetermined temporal period on pixels that compose an image sensor and carrying out image processing is included. The image processing unit generates a plurality of images with different sensitivities by an interpolation process using a plurality of images that have been picked up consecutively and generates a first combined image by combining the plurality of generated images with different sensitivities and generates a plurality of images with different sensitivities generated by an interpolation process on a single picked-up image and generates a second combined image by combining the plurality of generated images with different sensitivities. In addition, an HDR image is generated by blending pixel values of a first combined image and a second combined image in accordance with a blending ratio calculated in accordance with the movement detection information. By carrying out such processing, an HDR image in which deterioration in resolution is minimized is generated.

BRIEF DESCRIPTION OF THE DRAWINGS

FIGS. 20A and 20B are diagrams useful in explaining an example of exposure control of the image sensor;

FIGS. 22A and 22B are diagrams useful in explaining an example of exposure control of the image sensor;

FIGS. 23A and 23B are diagrams useful in explaining an example of exposure control of the image sensor;

FIGS. 24A and 24B are diagrams useful in explaining an example of exposure control of the image sensor;

FIG. 26B is a diagram useful in explaining an example of exposure control of the image sensor;

FIG. 26C is a diagram useful in explaining an example of exposure control of the image sensor;

FIG. 27 is a diagram useful in explaining an example configuration of an image processing apparatus;

FIG. 28 is a diagram useful in explaining examples of the configuration and processing of an HDR processing unit;

FIG. 33 is a diagram useful in explaining an example of a process reducing the number of output pixels of the image sensor;

FIGS. 34A and 34B are diagrams useful in explaining an example of a process reducing the number of output pixels of the image sensor;

FIG. 38 is a diagram useful in explaining examples of the configuration and processing of an inter-frame interpolation processing unit;

FIG. 41 is a diagram useful in explaining an example of exposure control of the image sensor.

DETAILED DESCRIPTION OF THE EMBODIMENTS

Figure 1:
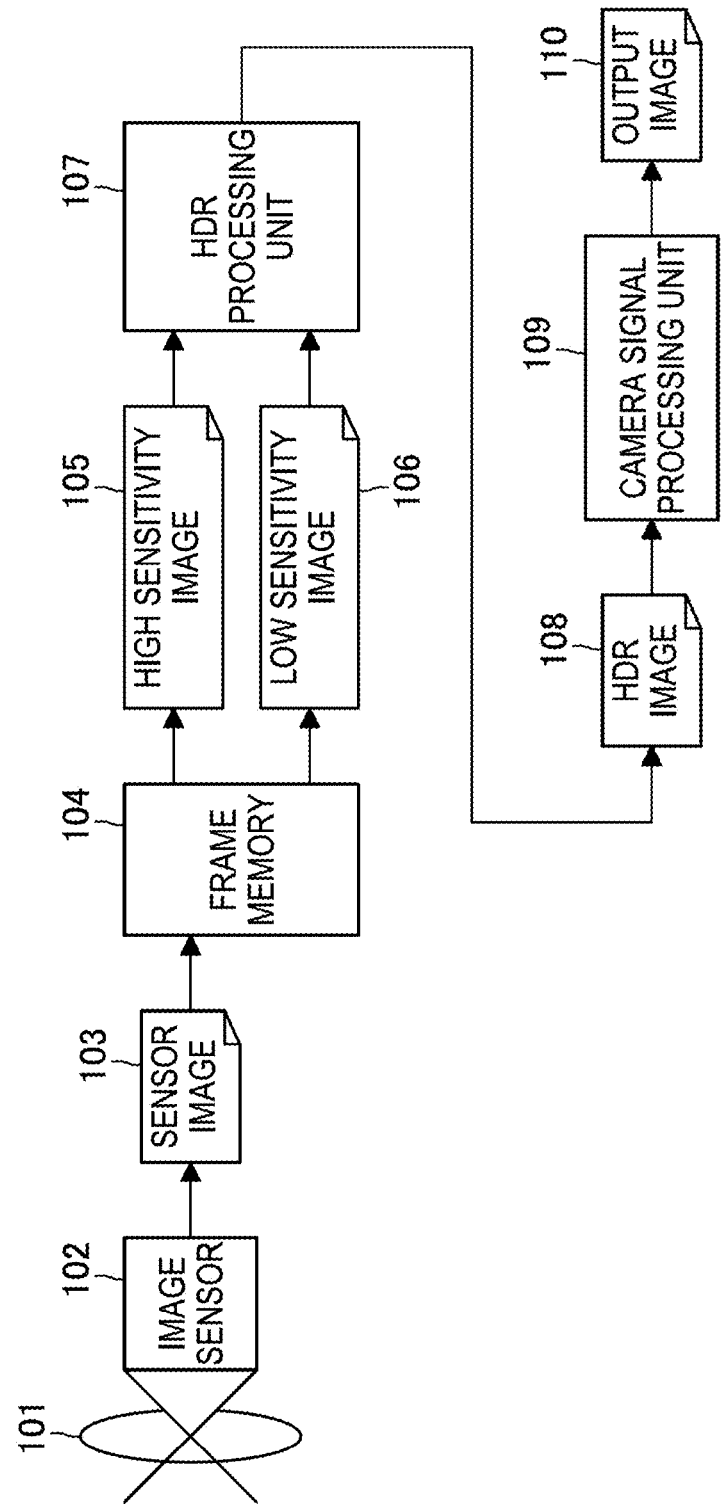
FIG. 1 is a diagram useful in explaining an example configuration of an image pickup apparatus that obtains a high-dynamic range (HDR) image.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

An image processing apparatus, an image pickup apparatus, an image processing method, and a program according to the present disclosure will now be described with reference to the drawings. The description is given in the order indicated below.

Figure 6:
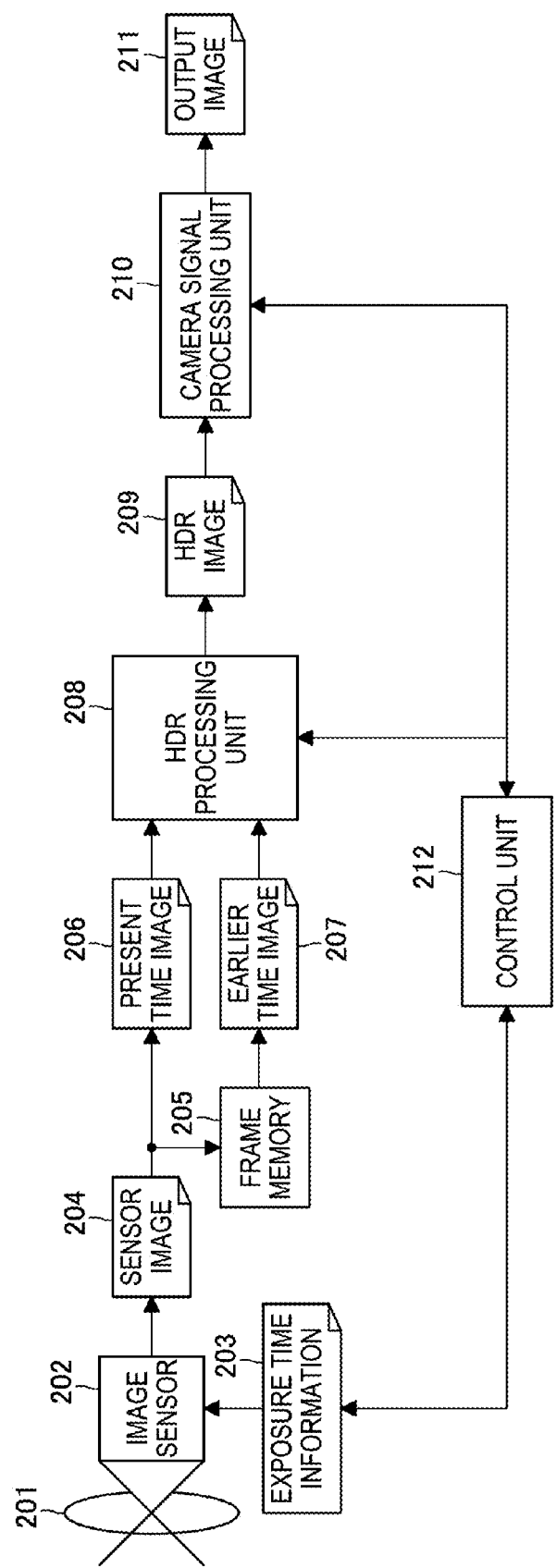
FIG. 6 is a diagram useful in explaining an example configuration of an image pickup apparatus according to an embodiment of the present disclosure that obtains an HDR image.

1. Configuration and Processing of a First Embodiment of an Image Processing Apparatus
2. Other Embodiments
2-1. Various Examples of Exposure Control Over an Image Sensor
2-2. Embodiments Where a Frame Memory is Unnecessary
2-3. Example Configuration That Carries Out a Pixel Adding Process or a Downsampling Process at Image Sensor Output
3. Comparison Between Image Processing Apparatus According to the Present Disclosure and an Existing Configuration
4. Conclusion 1. Configuration and Processing of a First Embodiment of an Image Processing Apparatus First, the configuration and processing of a first embodiment of an image processing apparatus according to the present disclosure will be described. Note that in the embodiment described below, an image pickup apparatus will be described as a representative example of an "image processing apparatus". FIG. 6 shows an example configuration of an image pickup apparatus. Light that is incident through an optical lens 201 is subject to photoelectric conversion by an image sensor 202 and a sensor image 204 is outputted from the image sensor 202. The image sensor 202 is constructed from a CMOS, for example.

The sensor image 204 outputted from the image sensor 202 is outputted to an HDR (High Dynamic Range) processing unit 208 as a present time image 206 and is also stored in a frame memory 205.

The HDR processing unit 208 inputs the present time image 206 from the image sensor 202 and also acquires an earlier time image 207, which was picked up at earlier timing than the present time image 206 and stored in the frame memory 205, from the frame memory 205.

The HDR processing unit 208 inputs two images that are (1) the present time image 206 and (2) the earlier time image 207. That is, HDR processing is carried out using the earlier time image 207 that is delayed and the present time image 206 that is not delayed to generate an HDR image 209. This processing will be described in detail later in this specification.

The HDR image 209 generated by the HDR processing unit 208 is inputted into a camera signal processing unit 210 and typical camera signal processing, such as white balance adjustment, gamma correction, and a demosaicing process, is carried out by the camera signal processing unit 210 to generate an output image 211.

A control unit 212 carries out exposure control over the image sensor 202 and processing control over the HDR processing unit 208 and the camera signal processing unit 210. Note that as one example, the control unit 212 includes a CPU with a program execution function and carries out overall control over the processing executed in the image pickup apparatus in accordance with programs stored in a memory, not shown.

The image sensor 202 is constructed of a CMOS for example, and is controlled in accordance with exposure time information 203 set by the control unit 212 so that the exposure time of pixels that compose the image sensor 202 changes in units of a specified spatial period and units of a specified temporal period. Note that a specific configuration of exposure time control processing in units of a spatial period and units of a temporal period is disclosed for example in Japanese Laid-Open Patent Publication No. 2006-253876, with exposure control being carried out here in the same way as in the cited publication.

Figure 7:
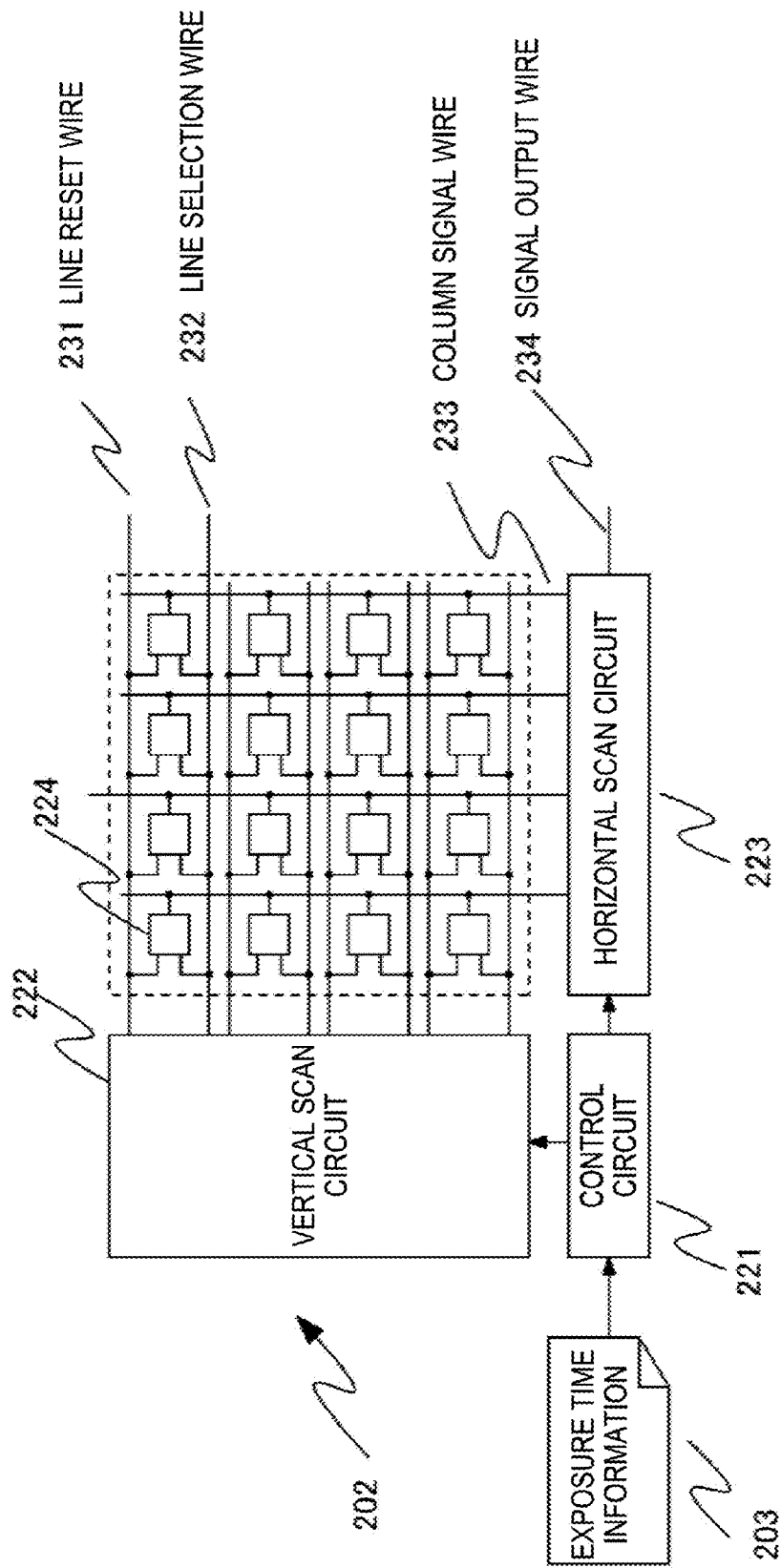
FIG. 7 is a diagram useful in explaining examples of the configuration and processing of an image sensor of the image pickup apparatus that obtains an HDR image.

An example configuration of the image sensor 202 is shown in FIG. 7. FIG. 7 shows part of the configuration of the image sensor 202 and the regions shown by the rectangles correspond to single pixels, which are indicated as "pixels 224". The image sensor 202 is provided, from the control unit 212, with a plurality of pieces of sensitivity information for setting the exposure time (i.e., exposure length) of the respective pixels as the "exposure time information 203". A control circuit 221 inside the image sensor 202 controls a vertical scan circuit 222 and a horizontal scan circuit 223 so that the exposure time (sensitivity) of the respective pixels changes in units of a spatial period and units of a temporal period in accordance with the exposure time information 203.

Figure 8:
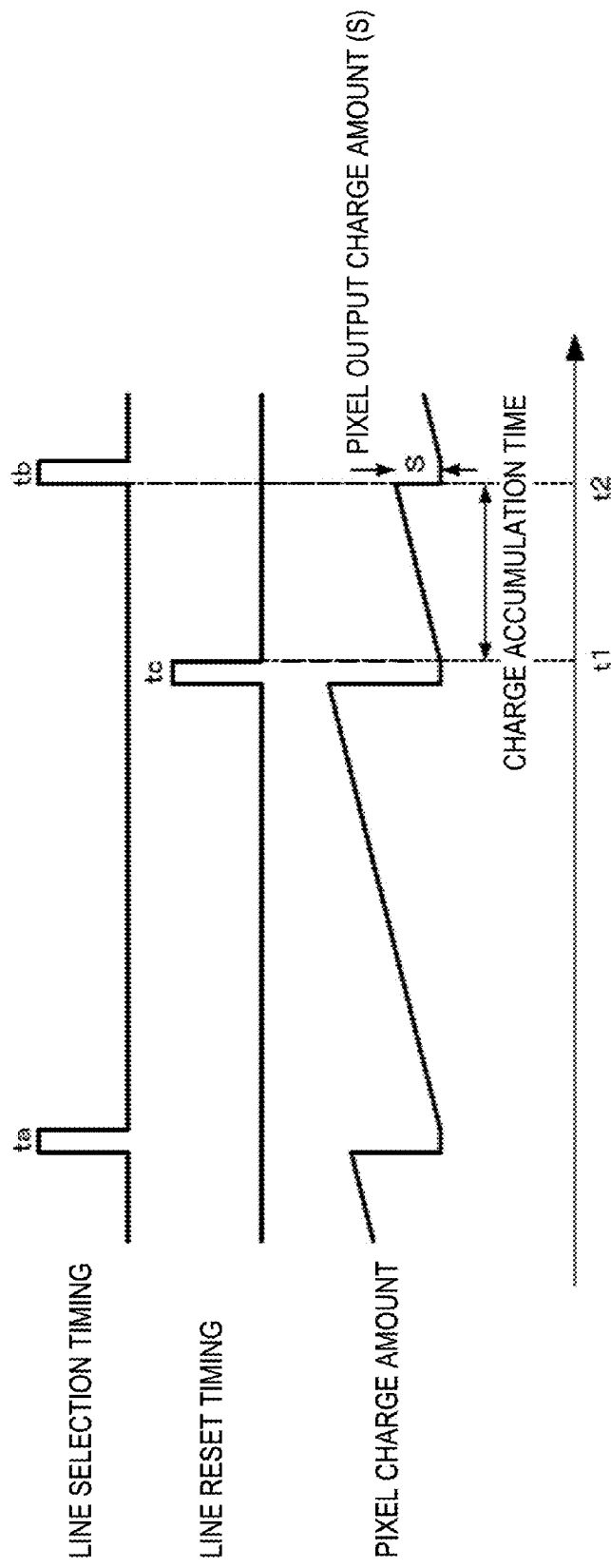
FIG. 8 is a diagram useful in explaining an example of processing of an image sensor of the image pickup apparatus that obtains an HDR image.

A method of changing the exposure time (sensitivity) of pixels will be described with reference to FIG. 8. FIG. 8 is a diagram showing signal timing of a line reset wire 231 shown in FIG. 7, signal timing of a line selection wire 232, and changes in the amount of charge of each pixel 224.

For example, when a line reset signal is inputted at time (t1), the charge of a pixel is reset and after that charge accumulates due to the incident light. After this, when the line selection signal is inputted at time (t2), the amount of charge at that time is outputted as pixel accumulated charge (S).

That is, the period between the times t1 and t2 from the line reset timing to the line selection timing is the charge accumulation period. The line selection timing is set for each line of pixels at an interval decided in advance. The line reset timing is adjustable and can be set at an arbitrary value between two line selection timings (shown in FIG. 8 as "ta" and "tb"). Such line reset timing is set in accordance with the exposure time information 203.

By controlling the line reset timing (tc) to become a later time (i.e., a time closer to the tb side) between the two line selection timings (shown as ta and tb in FIG. 8), it is possible to reduce the charge accumulation time for such line of pixels and as a result to reduce the sensitivity. Meanwhile, by controlling the line reset timing (tc) to become an earlier time (i.e., a time closer to the ta side) between the two line selection timings (shown as ta and tb in FIG. 8), it is possible to increase the charge accumulation time for such line of pixels and as a result to raise the sensitivity. By executing such control in line units, it is possible to set the exposure time, or in other words, the sensitivity, differently in line units.

An example of sensitivity control through control over exposure time in line units for an image sensor with a Bayer pattern composed of RGB pixels will now be described with reference to FIGS. 9A to 10. In the example shown in FIGS. 9A and 9B, low sensitivity pixels and high sensitivity pixels are alternately set in units of two lines. By making such settings by changing the line reset timing described earlier for two lines at a time, it is possible to set lines of low sensitivity pixels as short exposure lines and lines of high sensitivity pixels as long exposure lines in units of two lines as shown in FIGS. 9A and 9B.

FIG. 9A shows "Arrangement 1" and FIG. 9B shows "Arrangement 2". Lines of low sensitivity pixels as short exposure lines and lines of high sensitivity pixels as long exposure lines are interchanged in the illustrated arrangements. As one example during image pickup, exposure control is carried out according to Arrangement 1 in FIG. 9A for a first frame and exposure control is then carried out according to Arrangement 2 in FIG. 9B for a second frame. In addition, image pickup is carried out by alternately setting Arrangement 1 and Arrangement 2 for third, fourth, and fifth frames. An image pickup sequence is shown in FIG. 10.

Figure 9:
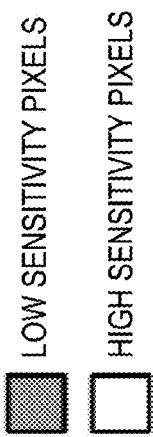
FIGS. 9A and 9B are diagrams useful in explaining examples of the configuration and processing of the image sensor of the image pickup apparatus that obtains an HDR image.
Figure 10:
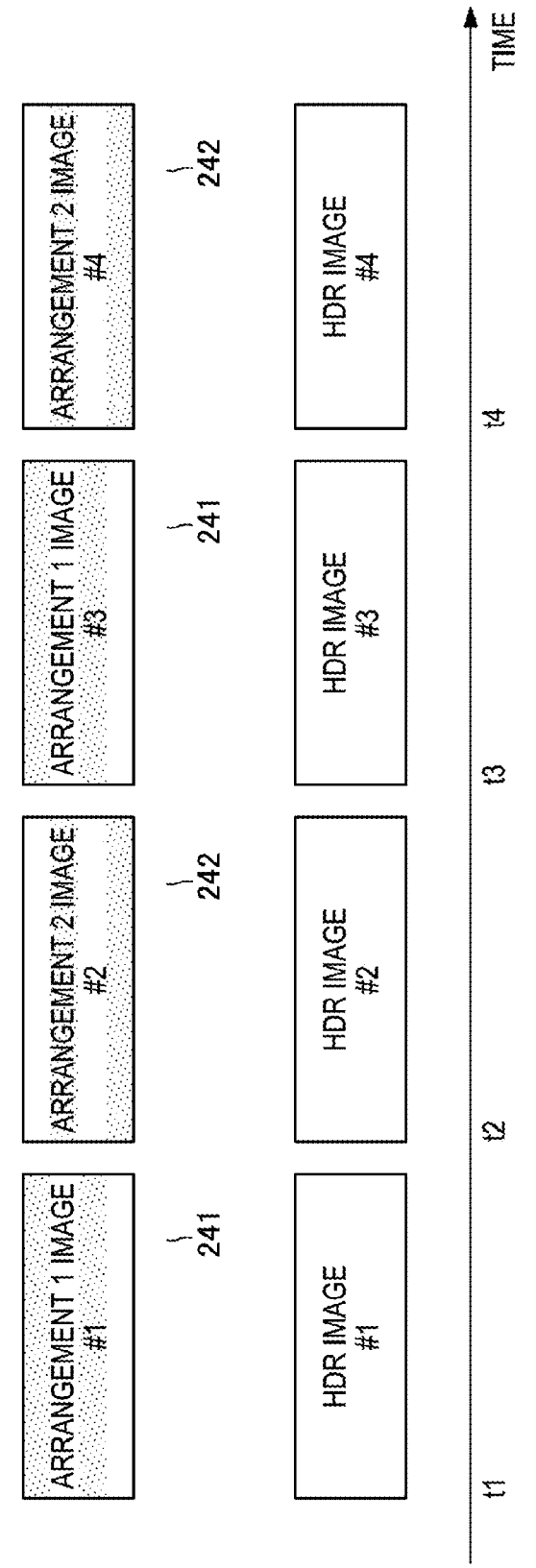
FIG. 10 is a diagram useful in explaining an example of processing of the image pickup apparatus that obtains an HDR image.

In the example shown in FIGS. 9A to 10, exposure time (sensitivity) control is carried out in a repeating pattern with four lines as one spatial period where pixels of two sensitivities are disposed two lines at a time. The exposure (sensitivity) control is also carried out with two frames as one temporal period, and by switching between the two arrangements 241, 242 shown in FIGS. 9A and 9B in consecutive frames, control is carried out to change the sensitivity of the respective pixels in each frame.

Next, the configuration and processing of the HDR processing unit 208 will be described with reference to FIG. 11.

As described earlier, two images, i.e., (1) the present time image 206 and (2) the earlier time image 207, are inputted into the HDR processing unit 208. That is, the HDR processing unit 208 carries out HDR processing using the earlier time image 207 that is delayed and the present time image 206 that is not delayed to generate the HDR image 209.

As shown in FIGS. 9A and 9B described earlier, the present time image 206 and the earlier time image 207 are images whose sensitivities differ both spatially and temporally, with the HDR processing unit 208 using such images to generate an HDR image.

An inter-frame interpolation processing unit 251 is a processing unit that generates images with high resolution. By using the present time image 206 and the earlier time image 207, the inter-frame interpolation processing unit 251 generates two interpolated images that are a low sensitivity pixel image composed of only low sensitivity pixels and a high sensitivity pixel image composed of only high sensitivity pixels.

Intra-frame interpolation processing units 252, 253 are processing units that generate interpolated images that follow movement. The intra-frame interpolation processing unit 252 carries out spatial interpolation processing using only the present time image 206 and the intra-frame interpolation processing unit 253 carries out spatial interpolation processing using only the earlier time image 207. By doing so, low sensitivity pixel images composed of only low sensitivity pixels and high sensitivity pixel images composed of only high sensitivity pixels are generated as interpolated images.

HDR combining processing units 254 to 256 refer to and combine the pixels of different sensitivities to acquire HDR images. A movement detection unit 257 uses the images generated by the HDR combining processing units 255 and 256 to detect whether the pixel value at a target pixel has changed due to movement or the like of an object between the earlier time and the present time.

A movement compensation processing unit 258 carries out a blending process on a high resolution image that was generated by the HDR combining processing unit 254 based on the present time image 206 and the earlier time image 207 and an image that follows movement (i.e., does not include movement-based artifacts) and was generated by the HDR combining processing unit 255 based on the present time image 206. The movement compensation processing unit 258 decides a blending ratio for the pixel values in pixel units using the movement detection result of the movement detection unit 257, and carries out a blending process for the two images.

In a tone conversion processing unit 259, bit value reduction is carried out for each pixel of the blended image generated by the movement compensation processing unit 258. Since the blended image generated by the movement compensation processing unit 258 represents the pixel values of high sensitivity pixels and low sensitivity pixels, the number of bits expressing the pixel value of each pixel will increase. Since there are cases where it will not be possible to carry out signal processing at the camera signal processing unit 210 located downstream if the number of bits is too high, the tone conversion processing unit 259 carries out processing to reduce the number of bits to a level that can be subjected to signal processing at the camera signal processing unit 210. That is, quantization-based compression is carried out to produce a similar number of bits as a conventional sensor output and the resulting signal is outputted as the HDR image 209.

Next, an example of the configuration and processing of the inter-frame interpolation processing unit 251 provided inside the HDR processing unit 208 shown in FIG. 11 will be described with reference to FIG. 12. As described earlier, the inter-frame interpolation processing unit 251 uses both the present time image 206 and the earlier time image 207 to generate a low sensitivity pixel image 263 composed of only low sensitivity pixels and a high sensitivity pixel image 264 composed of only low sensitivity pixels as interpolated images.

First, a target pixel position acquired by a coordinate acquiring unit 261 and pixel layout pattern information 262, which shows the exposure patterns (for example, Arrangements 1 and 2 in FIGS. 9A and 9B) of the picked-up images and is supplied for example from the control unit 212, are used to acquire the sensitivity at the position of a target pixel. Using this sensitivity information, low sensitivity pixels in the two consecutively picked up images (the present time image 206 and the earlier time image 207) are selected and the low sensitivity pixel image 263 composed of only low sensitivity pixels is generated. In the same way, using this sensitivity information, high sensitivity pixels in the two consecutively picked up images (the present time image 206 and the earlier time image 207) are selected and the high sensitivity pixel image 264 composed of only high sensitivity pixels is generated.

In this way, the inter-frame interpolation processing unit 251 uses pixel signals of a plurality of image frames with different exposure patterns to generate the low sensitivity pixel image 263 where all of the pixels are low sensitivity pixel signals and the high sensitivity pixel image 264 where all of the pixels are high sensitivity pixel signals.

The low sensitivity pixel image 263 and the high sensitivity pixel image 264 are images with the same pattern as the original picked-up images, and as one example, are images with a Bayer pattern. When the subject is stationary, the images 263 and 264 can realize the same resolution as the Bayer pattern. Meanwhile, when the subject has moved, since the present time image 206 and the earlier time image 207 used to generate the images 263 and 264 were acquired at different times, in some cases streak-like artifacts will be produced in keeping with the pattern in which the pixels are laid out.

Next, examples of the configuration and processing of the intra-frame interpolation processing units 252, 253 will be described with reference to FIG. 13. As described earlier, the intra-frame interpolation processing units 252, 253 are processing units that generate images that follow movement. The intra-frame interpolation processing unit 252 carries out a spatial interpolation process using only the present time image 206 and the intra-frame interpolation processing unit 253 carries out a spatial interpolation process using only the earlier time image 207. By carrying out such spatial interpolation processes that are adapted to single images, a low sensitivity pixel image composed of only low sensitivity pixels and a high sensitivity pixel image composed of only high sensitivity pixels are generated as interpolated images.

Figure 13:
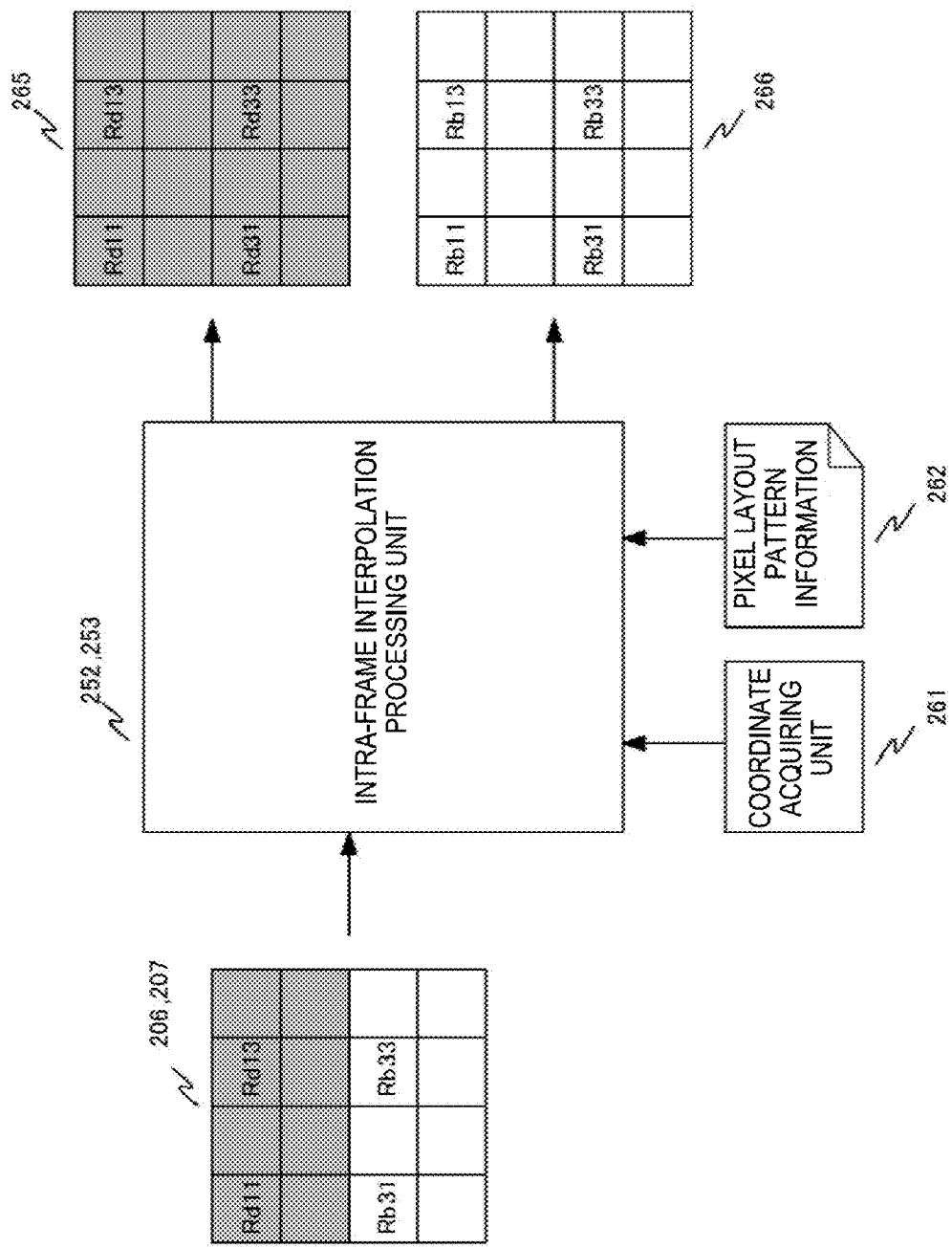
FIG. 13 is a diagram useful in explaining examples of the configuration and processing of an intra-frame interpolation processing unit.

The intra-frame interpolation processing units 252, 253 use the target pixel position acquired by the coordinate acquiring unit 261 shown in FIG. 13 and the pixel layout pattern information 262 to acquire the sensitivity at the position of the target pixel in the inputted present time image 206 or earlier time image 207. This sensitivity information and the pixel information included in one image out of the present time image 206 and the earlier time image 207 are used to generate images of different sensitivities, that is, a low sensitivity pixel image 265 composed of only low sensitivity pixels and a high sensitivity pixel image 266 composed of only high sensitivity pixels.

That is, although each intra-frame interpolation processing unit is capable of generating an image that follows the movement of the subject using only one image, there is also the problem of a drop in sensitivity.

The spatial interpolation process carried out by the intra-frame interpolation processing units 252, 253 will now be described with reference to FIGS. 13 and 14. The pixels Rd11, Rd13 in the low sensitivity pixel image 265 and the pixels Rb31, Rb33 in the high sensitivity pixel image 266 that are the outputs of the intra-frame interpolation processing units 252, 253 in FIG. 13 are pixels that are present in the input images, that is, the present time image 206 and the earlier time image 207 and are obtained by outputting pixels in the input images without amendment.

Meanwhile, the pixels Rd31, Rd33 in the low sensitivity pixel image 265 that is an output image and the pixels Rb11, Rb13 in the high sensitivity pixel image 266 that is an output image are not present in the input images. The pixel values of such pixels are set by calculation by carrying out spatial interpolation processing based on the pixel values included in the input images.

A method of interpolating the low sensitivity pixel Rd33 at a high sensitivity pixel position will now be described with reference to FIG. 14. The image shown in FIG. 14 shows the image inputted into the intra-frame interpolation processing unit 252 or 253, that is, the present time image 206 or the earlier time image 207. The pixels are set at low sensitivity pixels and high sensitivity pixels in units of two lines.

Figure 14:
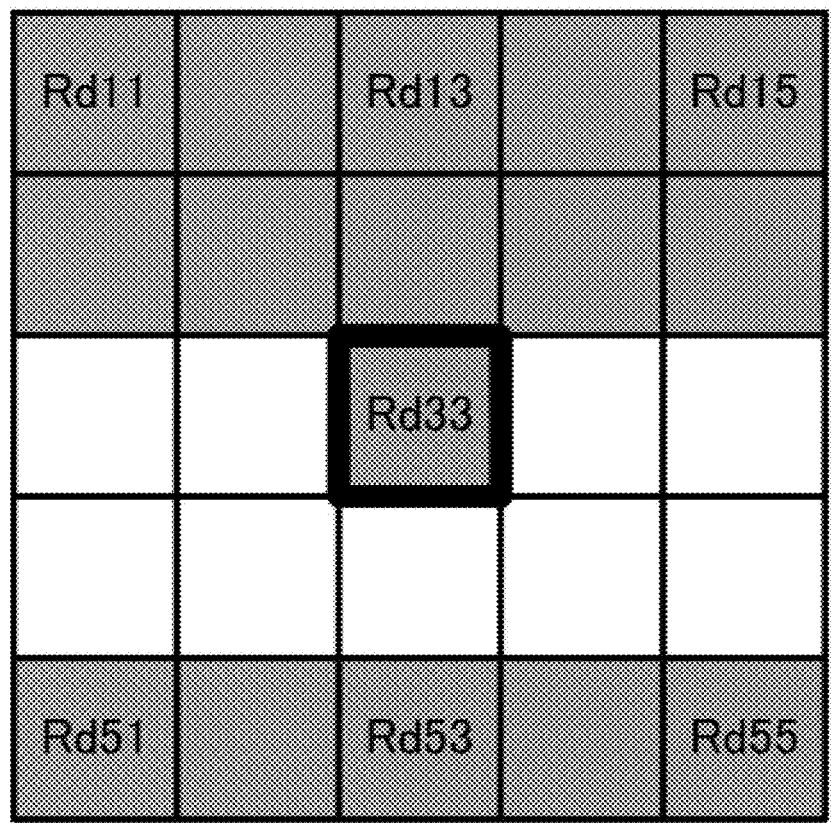
FIG. 14 is a diagram useful in explaining a specific example of an interpolation process.

The center pixel of the input image shown in FIG. 14 is a high sensitivity pixel. An interpolation process that calculates the pixel value Rd33 of a low sensitivity pixel at such high sensitivity position will now be described. The simplest interpolation method calculates the pixel value Rd33 in accordance with the equation given below.

$$Rd33=(Rd13+Rd53)/2 \qquad (1)$$

Equation (1) given above is an interpolation process that carries out linear interpolation based on pixel values of two low sensitivity pixels of the same color in the vertical direction.

As an alternative, an interpolation process that takes edge directions in the input images 206 and 207 into consideration may be carried out. More specifically, edge directions are first determined by Equations (2) to (4) given below.

$$\text{Edge\_1}=\text{Abs}(Rd11-Rd55) \qquad (2)$$

$$\text{Edge\_2}=\text{Abs}(Rd13-Rd53) \qquad (3)$$

$$\text{Edge\_3}=\text{Abs}(Rd15-Rd51) \qquad (4)$$

Using Equations (2) to (4) described above, Edge_1, Edge_2, and Edge_3 are calculated.

When Edge_1 is the smallest value out of Edge_1, Edge_2, and Edge_3 calculated in accordance with Equations (2) to (4) described above, the pixel value Rd33 of the low sensitivity pixel at the high sensitivity pixel position which is the center pixel in the input image shown in FIG. 14 is calculated in accordance with the equation given below.

$$Rd33=(Rd11+Rd55)/2$$

When Edge_2 is the smallest value out of Edge_1, Edge_2, and Edge_3 calculated in accordance with Equations (2) to (4) described above, the pixel value Rd33 of the low sensitivity pixel at the high sensitivity pixel position which is the center pixel of the input image shown in FIG. 14 is calculated in accordance with the equation given below.

$$Rd33=(Rd13+Rd53)/2$$

When Edge_3 is the smallest value out of Edge_1, Edge_2, and Edge_3 calculated in accordance with Equations (2) to (4) described above, the pixel value Rd33 of the low sensitivity pixel at the high sensitivity pixel position which is the center pixel of the input image shown in FIG. 14 is calculated in accordance with the equation given below.

$$Rd33=(Rd15+Rd51)/2$$

This processing is a method that carries out an interpolation process that selects pixel values along edge directions as reference pixels.

Note that the example of the interpolation process described here is merely one example of an intra-frame interpolation process, and it is possible to apply a different method and carry out nearest neighbor interpolation. For example, it is also possible to apply a method that generates a luminance signal using certain G pixels for which there are double the number of samples compared to R pixels and then uses such luminance signal to recreate a high-frequency component of an R pixel. In this way, the intra-frame interpolation processing units 252, 253 each carry out an interpolation process based on a single inputted image to generate images of different sensitivities in the form of the low sensitivity pixel image 265 composed of only low sensitivity pixels and the high sensitivity pixel image 266 composed of only high sensitivity pixels.

Next, examples of the configuration and processing of the HDR combining processing units 254 to 256 will each be described with reference to FIG. 15. The HDR combining processing units 254 to 256 input two interpolated images generated by the inter-frame interpolation processing unit 251 and the intra-frame interpolation processing units 252, 253 described with reference to FIGS. 12 and 13, that is, a low sensitivity pixel image composed of only low sensitivity pixels and a high sensitivity pixel image composed of only high sensitivity pixels.

Figure 15:
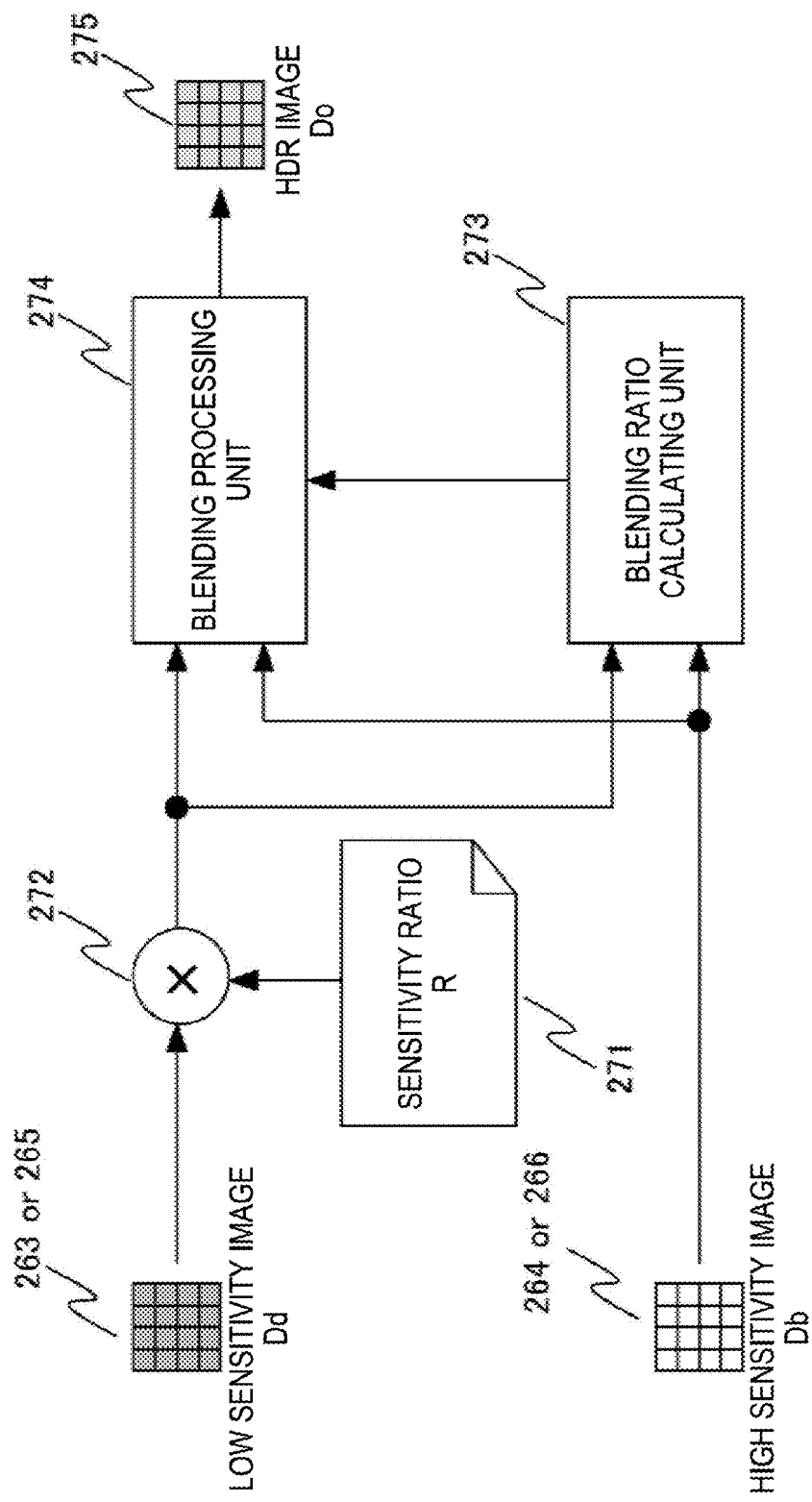
FIG. 15 is a diagram useful in explaining examples of the configuration and processing of an HDR combining processing unit.

In FIG. 15, the two images are shown as the low sensitivity image Dd (numbered "263 or 265") and the high sensitivity image Db (numbered "264 or 266"). In addition, the sensitivity ratio R (numbered "271") between the low sensitivity pixels and the high sensitivity pixels is inputted for example from the control unit 212. The sensitivity ratio R (271) corresponds to the ratio of the respective exposure times of low sensitivity pixels and high sensitivity pixels.

The HDR combining processing units 254 to 256 use a low sensitivity image Dd (263 or 265), a high sensitivity image Db (264 or 266), and the sensitivity ratio R (271) to generate an HDR image Do (numbered "272").

A blending ratio calculating unit 273 refers to the respective pixel values of corresponding pixel positions at the same positions in the low sensitivity image Dd and the high sensitivity image Db and decides a blending ratio for the pixel values of corresponding pixels in the low sensitivity image Dd and the high sensitivity image Db so that as one example, the weighting of the high sensitivity image Db is large when the pixel value of the high sensitivity image is smaller than a threshold Th set in advance and the weighting of the low sensitivity image Dd is large when the pixel value of the high sensitivity image is equal to or larger than the threshold Th.

A blending processing unit 274 carries out a blending process for the pixel values of corresponding pixels in the low sensitivity image Dd and the high sensitivity image Db based on the blending ratio decided by the blending ratio calculating unit 273. By carrying out this process, it is possible to generate a high-dynamic range image (the HDR image Do (numbered "275")) that has little noise when the subject is dark and suppresses saturation when the subject is bright.

Specific examples of the processing carried out by the HDR combining processing units 254 to 256 shown in FIG. 15 will now be described. First, one target pixel to be processed is selected from the high sensitivity image Db and the pixel value of the target pixel is compared with the threshold Th set in advance. When the pixel value of the target pixel is smaller than the threshold Th, the pixel value of the target pixel in the high sensitivity image Db (264 or 266) is set without amendment as a pixel value of the HDR image Do (275) that is the output image. The pixel value in this case satisfies the relationship $$Do = Db$$

where "Do" represents the pixel value of the HDR image Do (275) and "Db" represents the pixel value of the focus pixel in the high sensitivity image Db (264 or 266).

Meanwhile, when the pixel value of the target pixel selected from the high sensitivity image Db is equal to or larger than the threshold Th, a pixel value produced by multiplying, by the sensitivity ratio R, the pixel value of the pixel position in the low sensitivity image Dd (263 or 265) at the same position as the pixel position of the target pixel in the high sensitivity image Db is set as a pixel value of the HDR image Do (275) that is the output image. The pixel value in this case satisfies the relationship $$Do = Dd \times R$$

where "Do" represents the pixel value of the HDR image Do (275) and "Dd" represents the pixel value in the low sensitivity image Dd (263 or 265).

Note that when the variables a, b are used as the blending ratio calculated by the blending ratio calculating unit 273, the processing described above can be generalized by the following equation to calculate the pixel values Do of the HDR image Do (275)

$$Do = (a \times Db) + (b \times (Dd \times R))$$

where a+b=1.

Note that although the processing described earlier shows an example where one of a=1, b=0 and a=0, b=1 is used, it is also possible to selectively use values of a and b within a range of a=0~1 and b=1~0 so long as the condition that a+b=1 is satisfied.

Figure 16:
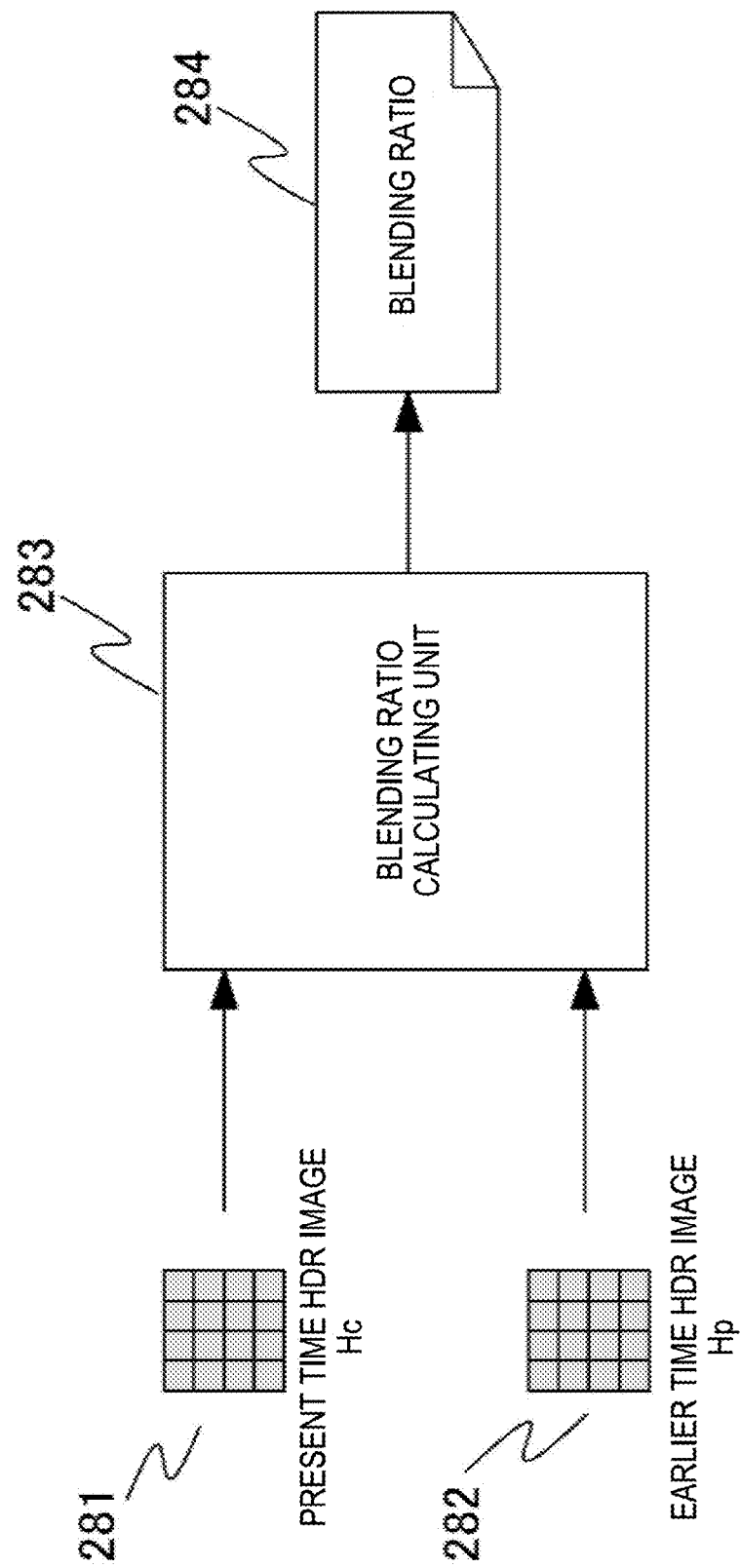
FIG. 16 is a diagram useful in explaining the configuration and processing of a movement detection unit of an HDR processing unit.
Figure 17:
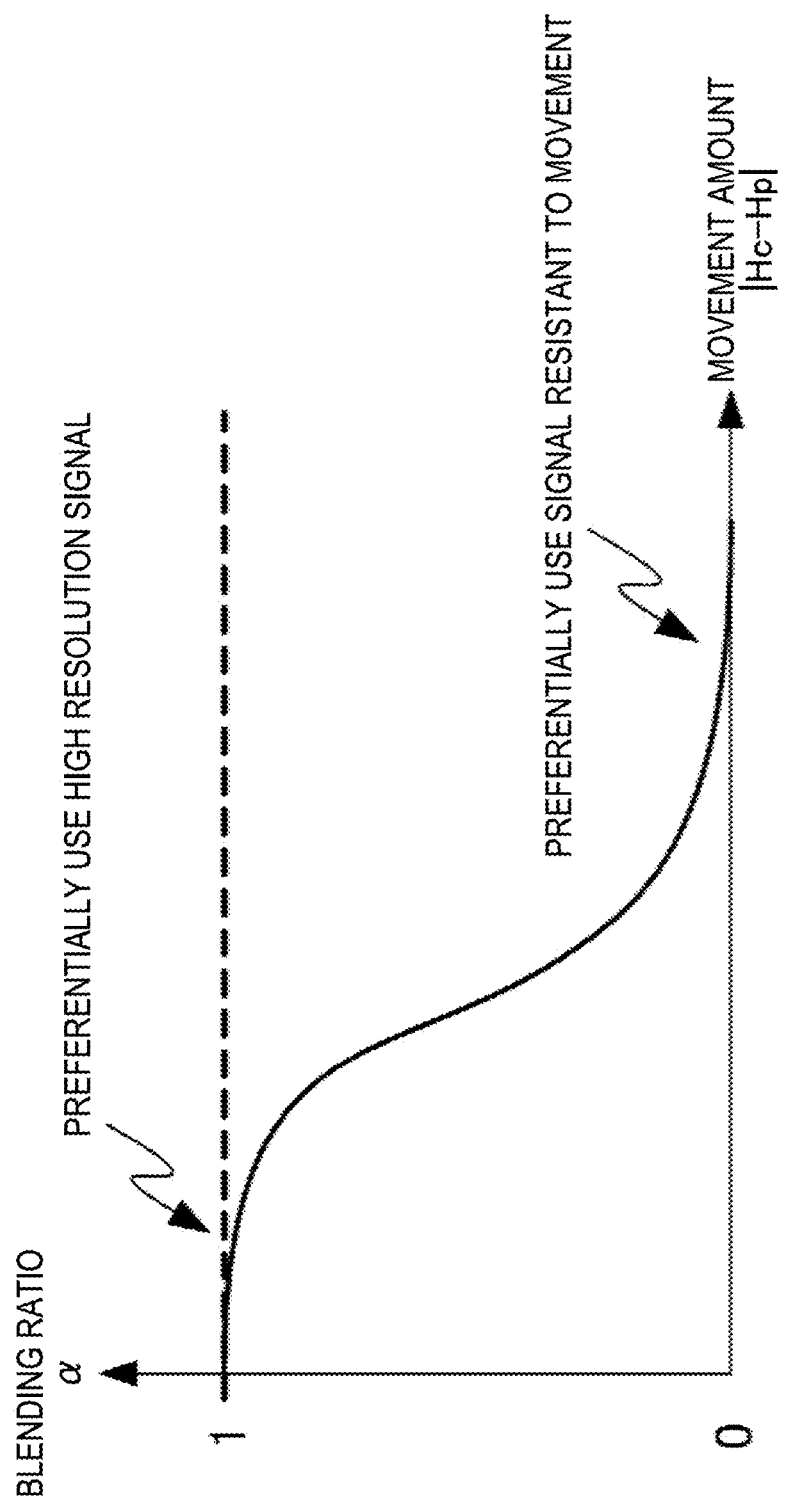
FIG. 17 is a diagram useful in explaining a blending ratio set by the movement detection unit of the HDR processing unit.

Next, examples of the configuration and processing of the movement detection unit 257 of the HDR processing unit 208 shown in FIG. 11 will be described with reference to FIGS. 16 and 17. The movement detection unit 257 compares an HDR image corresponding to the present time image generated by the HDR combining processing unit 255 based on the present time image 206 and an HDR image corresponding to the earlier time image generated by the HDR combining processing unit 256 based on the earlier time image 207 to detect movement in pixel units. As one example, an absolute difference in the pixel values of corresponding pixels at the same pixel position in the two HDR images is compared with a threshold set in advance and if the absolute difference is equal to or above the threshold, a determination of "large movement" or "movement present" is given, while if the absolute difference is below the threshold, a determination of "little movement" or "no movement" is given.

In this way, the amount of movement is determined based on an absolute difference between pixel values of corresponding pixels in an HDR image generated from a present time image and an HDR image generated from an earlier time image. As shown in FIG. 16, the movement compensation processing unit 258 includes a blending ratio calculating unit 283 and carries out a blending process by deciding, in accordance with the amount of movement in pixel units determined by the movement detection unit 257, a blending ratio 284 for pixel values of corresponding pixels in (a) an HDR image generated by the HDR combining processing unit 254 based on the present time image 206 and the earlier time image 207 and (b) an HDR image generated by the HDR combining processing unit 255 based on only the present time image 206.

For pixels where the amount of movement is larger than the threshold set in advance, the blending ratio of the pixel values in (b) the HDR image generated by the HDR combining processing unit 255 based on only the present time image 206 is set larger. Conversely, for pixels where the amount of movement is below the threshold set in advance, the blending ratio of the pixel values in (a) the HDR image generated by the HDR combining processing unit 254 based on the present time image 206 and the earlier time image 207 is set larger. More specifically, a blending ratio α set in accordance with the amount of movement shown in FIG. 17 for example is used.

The movement compensation processing unit 258 carries out a blending process for the respective pixels of the two images (a) and (b) described above based on the blending ratio set in this way. By carrying out such processing, an HDR image is generated by carrying out a blending process with a large weighting set for pixel values in (b) the HDR image generated by the HDR combining processing unit 255 based on only the present time image 206 for pixel positions where there is large movement and a blending process with a large weighting set for pixel values in (a) the HDR image generated by the HDR combining processing unit 254 based on the present time image 206 and the earlier time image 207 for pixel positions where there is little movement. Note that movement detection may be carried out using another method, such as a method that also considers noise and/or edges and uses absolute differences between a low-frequency component image for the present time image and a low-frequency component image at an earlier time.

Figure 11:
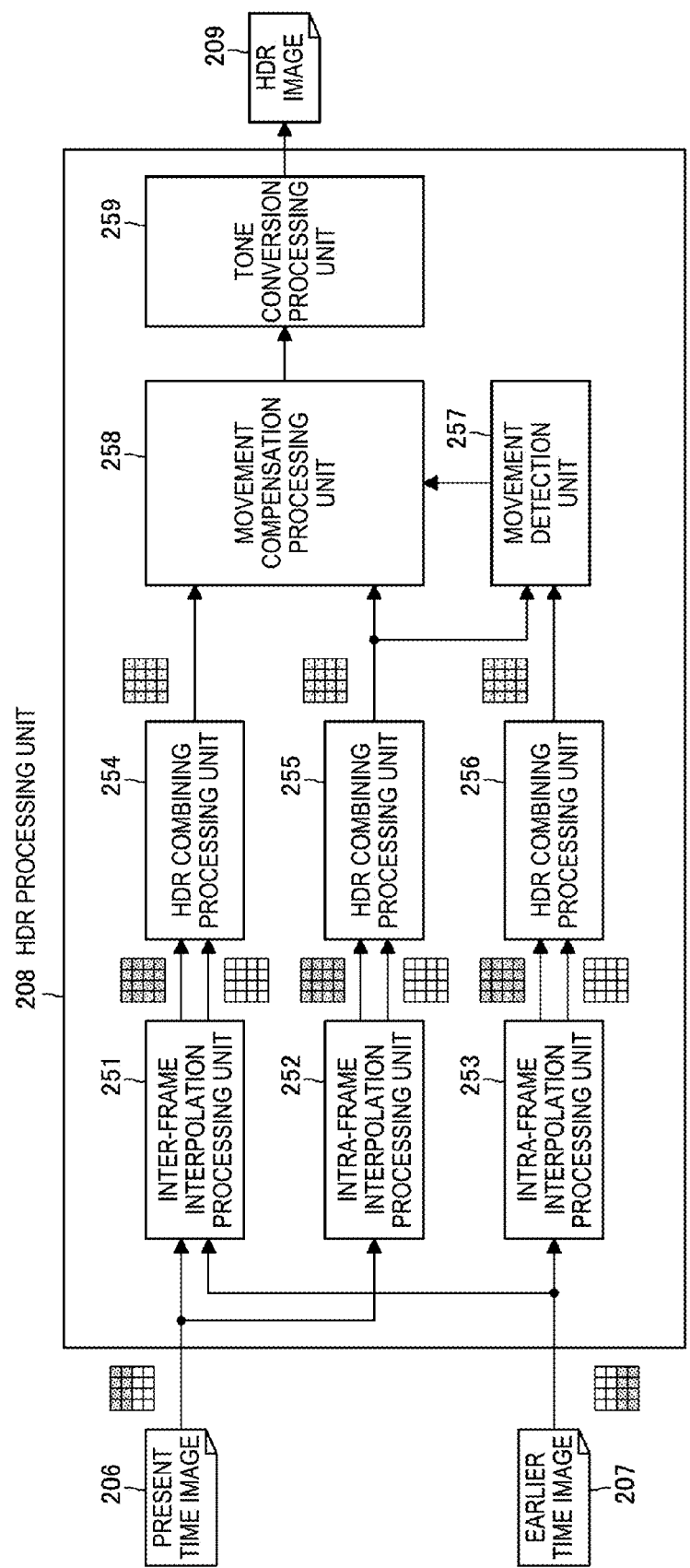
FIG. 11 is a diagram useful in explaining examples of the configuration and processing of an HDR processing unit of the image pickup apparatus that obtains an HDR image.

The tone conversion processing unit 259 that is the final processing unit of the HDR processing unit 208 shown in FIG. 11 carries out processing that compresses the range that has been expanded by the HDR combining processing described above with reference to FIG. 15.

The HDR combining processing described with reference to FIG. 15 expands the range relative to the output of an existing image sensor, for example, by an amount corresponding to the sensitivity ratio R (271) shown in FIG. 15. If this expanded range is used without amendment, there are cases where signal processing cannot be carried out by the camera signal processing unit 210 (see FIG. 6) located downstream.

To prevent such problem, processing that compresses the range expanded by the HDR combining process described with reference to FIG. 15 is carried out in the tone conversion processing unit 259. Note that tone conversion and tone reproduction processing are known examples of methods of compressing the range to the range of a conventional sensor output. One example is disclosed in Erik Reinhard et al. "Photographic Tone Reproduction for Digital Images", http://www.cs.utah.edu/~reinhard/cdrom/tonemap.pdf.

Figure 18:
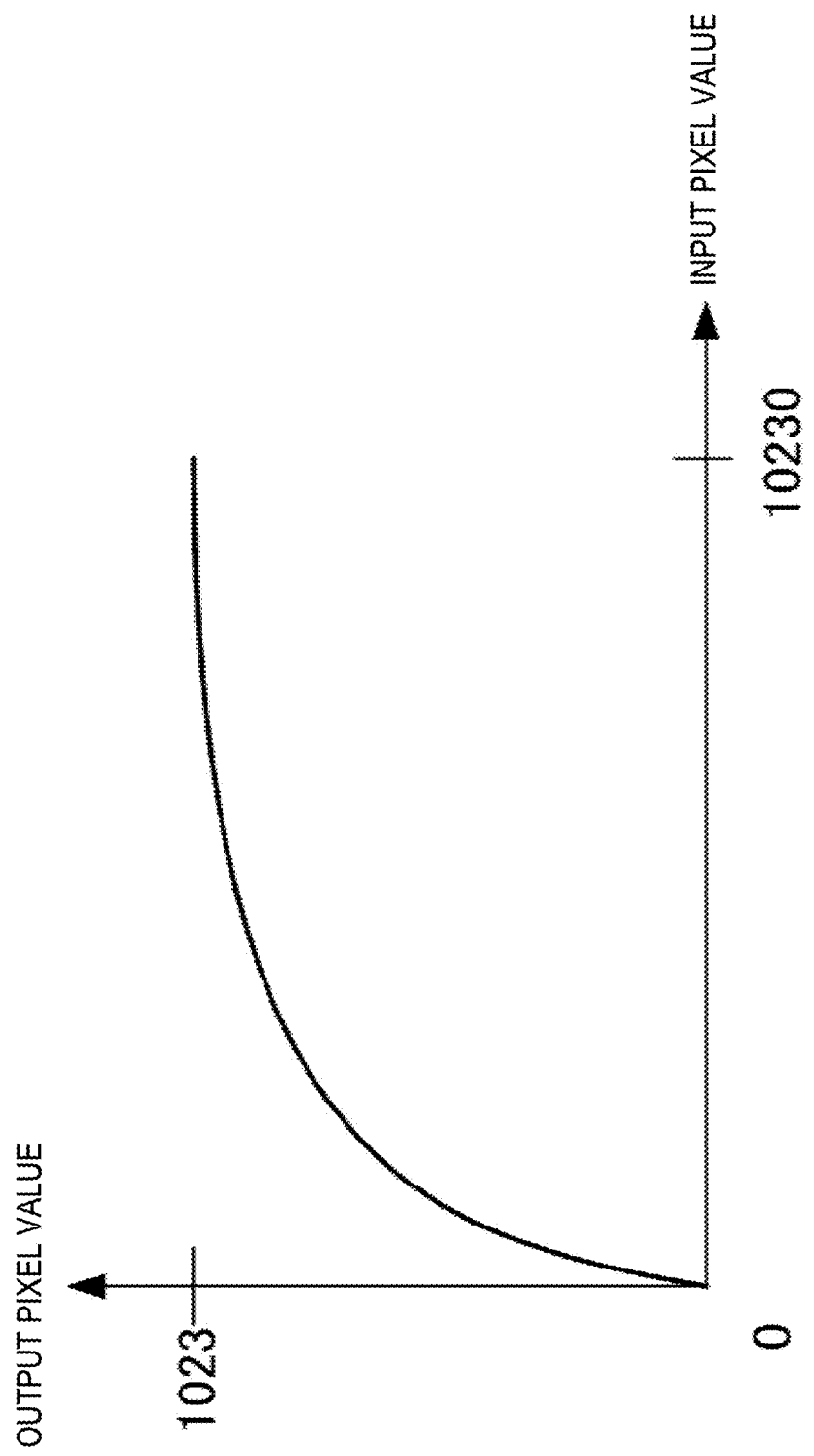
FIG. 18 is a diagram useful in explaining an example of a tone conversion process carried out by a tone conversion processing unit that is a final processing unit of the HDR processing unit.

An example of tone conversion where the sensor output is 10 bit and the sensitivity ratio R is 10 times is shown in FIG. 18. When the maximum value of the sensor input is 1,023 and the sensitivity ratio R=10, the tone conversion processing unit 259 obtains an image with a maximum of 10,230 (1,023×10) values. By compressing the HDR image in the tone conversion processing unit 259 using the curve shown in FIG. 18 so as to always have a 10-bit range, it is possible to use the same processing as in the past for the processing downstream. The curve shown in FIG. 18 is generated using statistical values such as average luminance and maximum luminance of an image as described in Reinhard et al., and will therefore depend on the image being compressed.

2. Other Embodiments

Next other embodiments that differ to the above embodiment will be described.

2-1. Various Examples of Exposure Control Over an Image Sensor

In the embodiment described above, as described with reference to FIG. 4, a configuration is used where, as the exposure control process over the image sensor 202, control is carried out to switch the pixel sensitivity between low sensitivity pixels with a short exposure time and high sensitivity pixels with a long exposure time in units of two lines.

Figure 4:
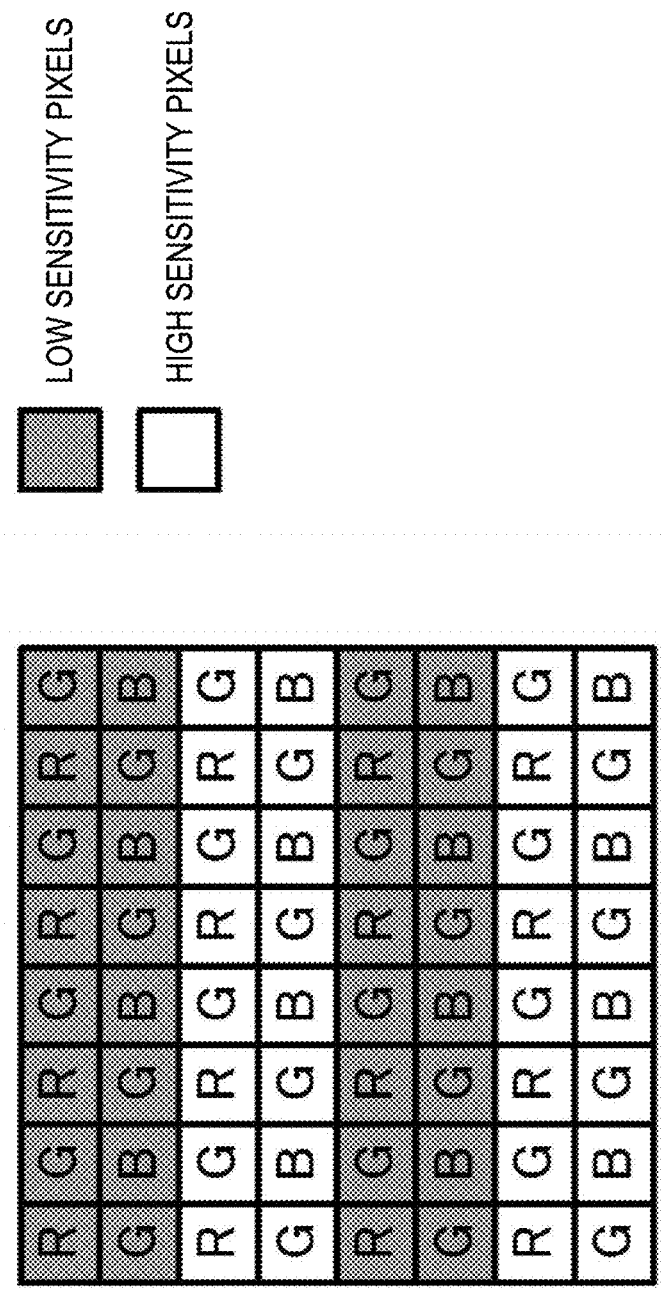
FIG. 4 is a diagram useful in explaining an example of exposure control of an image sensor of the other image pickup apparatus that obtains an HDR image.
Figure 19B:
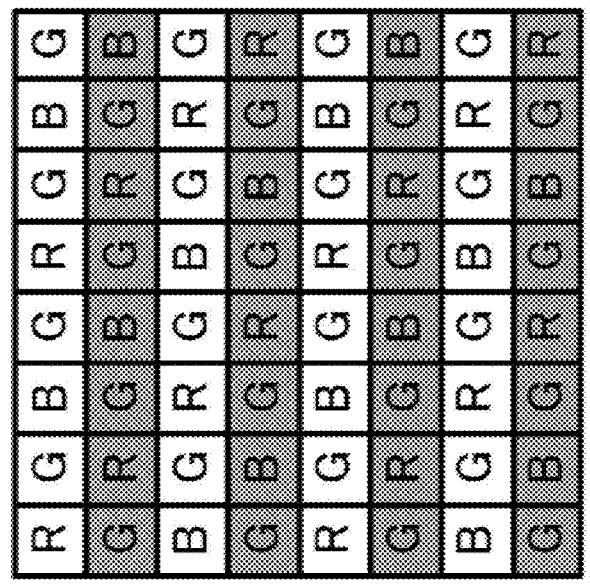
FIGS. 19A and 19B are diagrams useful in explaining an example of exposure control of the image sensor.
Figure 19A:
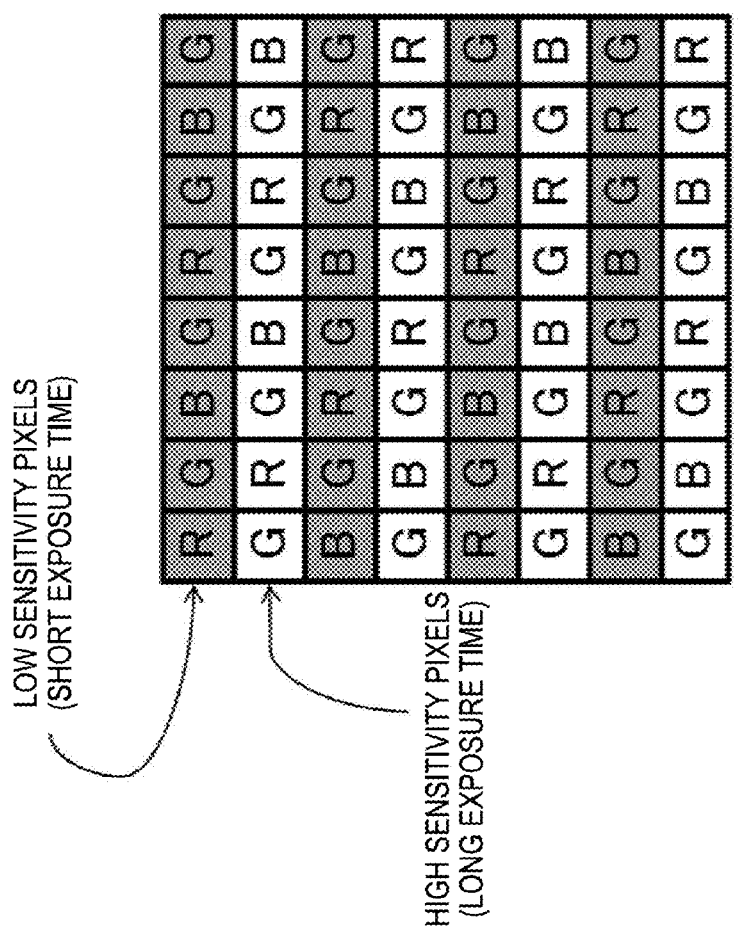

The exposure control processing configuration of the image sensor 202 is not limited to the setting shown in FIG. 4 and it is possible to use a variety of settings. It is also possible to apply the image processing according to the present disclosure to a variety of control configurations. For example, as shown in FIGS. 19A to 20, a configuration that sets low sensitivity pixels, where a short exposure is carried out, and high sensitivity pixels, where a long exposure is carried out, on every other line may be used. It is also possible to apply the image processing according to the present disclosure to such a control configuration. Note that in FIGS. 19A to 20, the white pixel positions show high sensitivity pixels where a long exposure is carried out and the gray pixel positions show low sensitivity pixels where a short exposure is carried out. This also applies to FIGS. 21A to 25 described below.

Figures 21A, 21B:
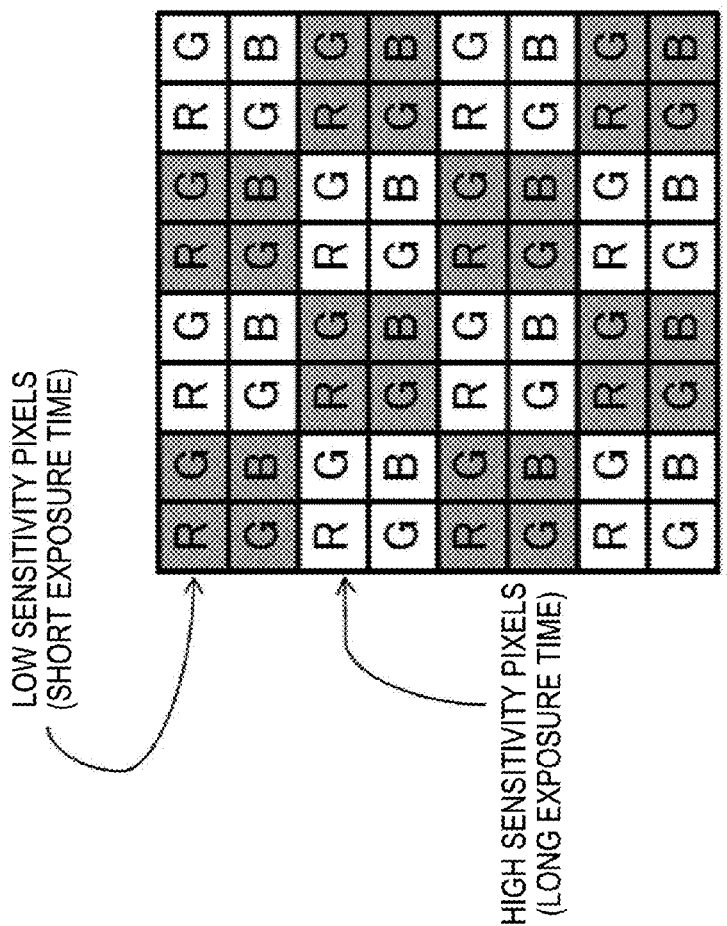
FIGS. 21A and 21B are diagrams useful in explaining an example of exposure control of the image sensor.

Also, as shown in FIGS. 21A and 21B, a construction may be used that sets low sensitivity pixels, where a short exposure is carried out, and high sensitivity pixels, where a long exposure is carried out, in units of four pixels in two lines and two columns that repeat in the form of a Bayer pattern.

As shown in FIGS. 22A and 22B, it is also possible to use a configuration that carries out exposure control having uniformly set pixels of the respective sensitivities of the respective colors in a Bayer pattern, that is, where high sensitivity R pixels, low sensitivity R pixels, high sensitivity G pixels, low sensitivity G pixels, high sensitivity B pixels, and low sensitivity B pixels are disposed uniformly.

Also, although examples of control configurations for image sensors (image pickup elements) that all have Bayer patterns have been described above, it is also possible to apply the processing of the present disclosure to an image sensor (image pickup element) with a layout aside from a Bayer pattern. As one example, as shown in FIGS. 23A and 23B, it is possible to apply the present disclosure to a non-Bayer pattern with a RGBW configuration that includes white (W) pixels in addition to RGB. In the exposure control examples shown in FIGS. 23A and 23B, an example configuration where low sensitivity pixels, where a short exposure is carried out, and high sensitivity pixels, where a long exposure is carried out, are set in units of 16 pixels composed of four lines and four columns on an image sensor with an RGBW pixel pattern. It is also possible to apply the image processing according to the present disclosure to such control configuration.

In addition, it is possible to apply the image processing according to the present disclosure to a configuration where low sensitivity pixels, where a short exposure is carried out, and high sensitivity pixels, where a long exposure is carried out, are set as shown in FIGS. 24A and 24B on an image sensor which, in the same way as FIGS. 23A and 23B, has a non-Bayer pattern composed of RGBW pixels as shown in FIGS. 24A and 24B.

Figure 25B:
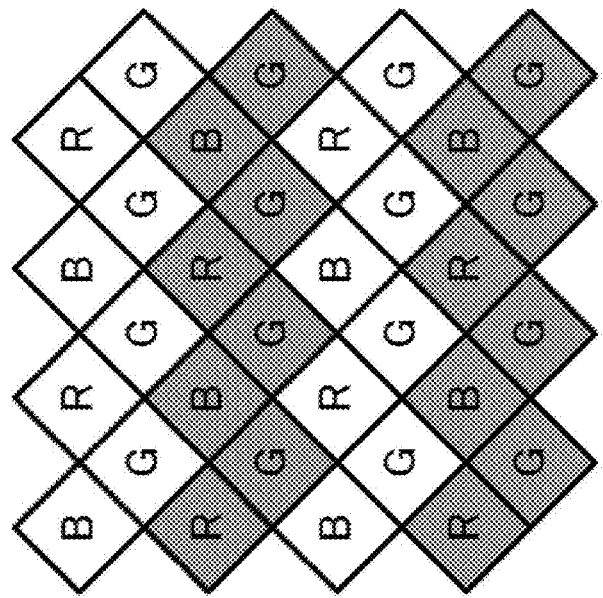
FIGS. 25A and 25B are diagrams useful in explaining an example of exposure control of the image sensor.
Figure 25A:
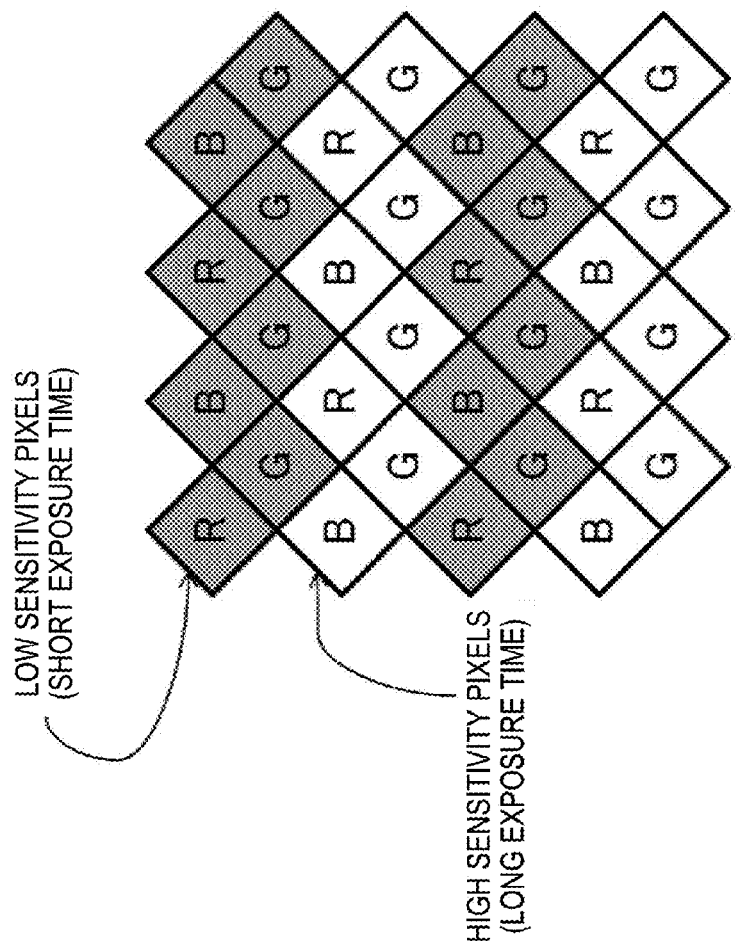

It is also possible to apply the image processing according to the present disclosure to a configuration where low sensitivity pixels, where a short exposure is carried out, and high sensitivity pixels, where a long exposure is carried out, are set as shown in FIGS. 25A and 25B for a pixel image pickup element constructed by rotating a square grid by 45 degrees as shown in FIGS. 25A and 25B.

Figure 26A:
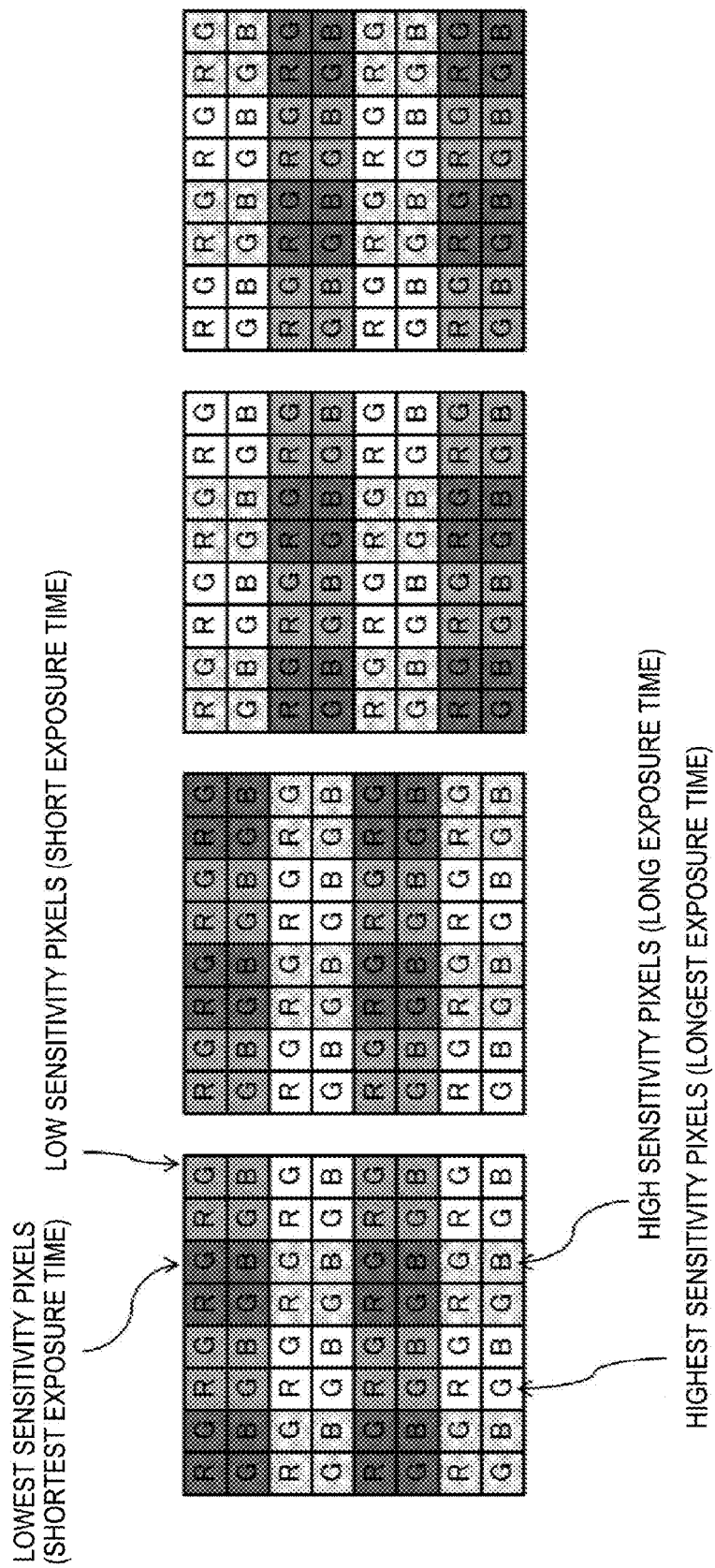
FIG. 26A is a diagram useful in explaining an example of exposure control of the image sensor.

Also, although examples have been described above where pixels of two different sensitivities, i.e., low sensitivity pixels, where a short exposure is carried out, and high sensitivity pixels, where a long exposure is carried out, are set, it is also possible to set pixels of three or more different sensitivities and to generate an HDR image using such pixels of three or more different sensitivities. Note that in the example shown in FIG. 26A, pixels of four different sensitivities are set. That is, an example is shown where pixels of four different sensitivities are set, i.e., high sensitivity pixels (longest exposure time), medium-high sensitivity pixels (long exposure time), medium low sensitivity pixels (short exposure time), and low sensitivity pixels (shortest exposure time). The image processing according to the present disclosure can also be applied to the output of such an image sensor with pixels of three or more different sensitivities.

Note that in this case, in the inter-frame interpolation processing unit 251 and the intra-frame interpolation processing units 252, 253 that were described with reference to FIGS. 12 and 13, four images composed of a low sensitivity image, a medium-low sensitivity image, a medium-high sensitivity image, and a high sensitivity image are generated by the interpolation processing.

Also, the HDR combining processing units 254 to 256 described with reference to FIG. 15 input the low sensitivity image, the medium-low sensitivity image, the medium-high sensitivity image, and the high sensitivity image and generate HDR images.

The blending ratio calculating unit 273 refers to the pixel values of four pixels at corresponding pixel positions with the same position in the low sensitivity image, the medium-low sensitivity image, the medium-high sensitivity image, and the high sensitivity image and carries out blending by deciding the blending ratio for the pixel values of the corresponding pixels in the images of the different sensitivities to decide the pixel values of the HDR image so that the weighting of the high sensitivity image is increased when the pixel value of the highest sensitivity image is smaller than a threshold Th1 set in advance, the weighting of the medium-high sensitivity image is increased when the pixel value of the high sensitivity image is larger than a threshold Th1 set in advance but is smaller than a threshold Th2, the weighting of the medium-low sensitivity image is increased when the pixel value of the high sensitivity image is larger than the threshold Th2 set in advance but is smaller than a threshold Th3, and the weighting of the low sensitivity image is increased when the pixel value of the high sensitivity image is larger than a threshold Th3 set in advance but is smaller than a threshold Th4.

Figure 26B:
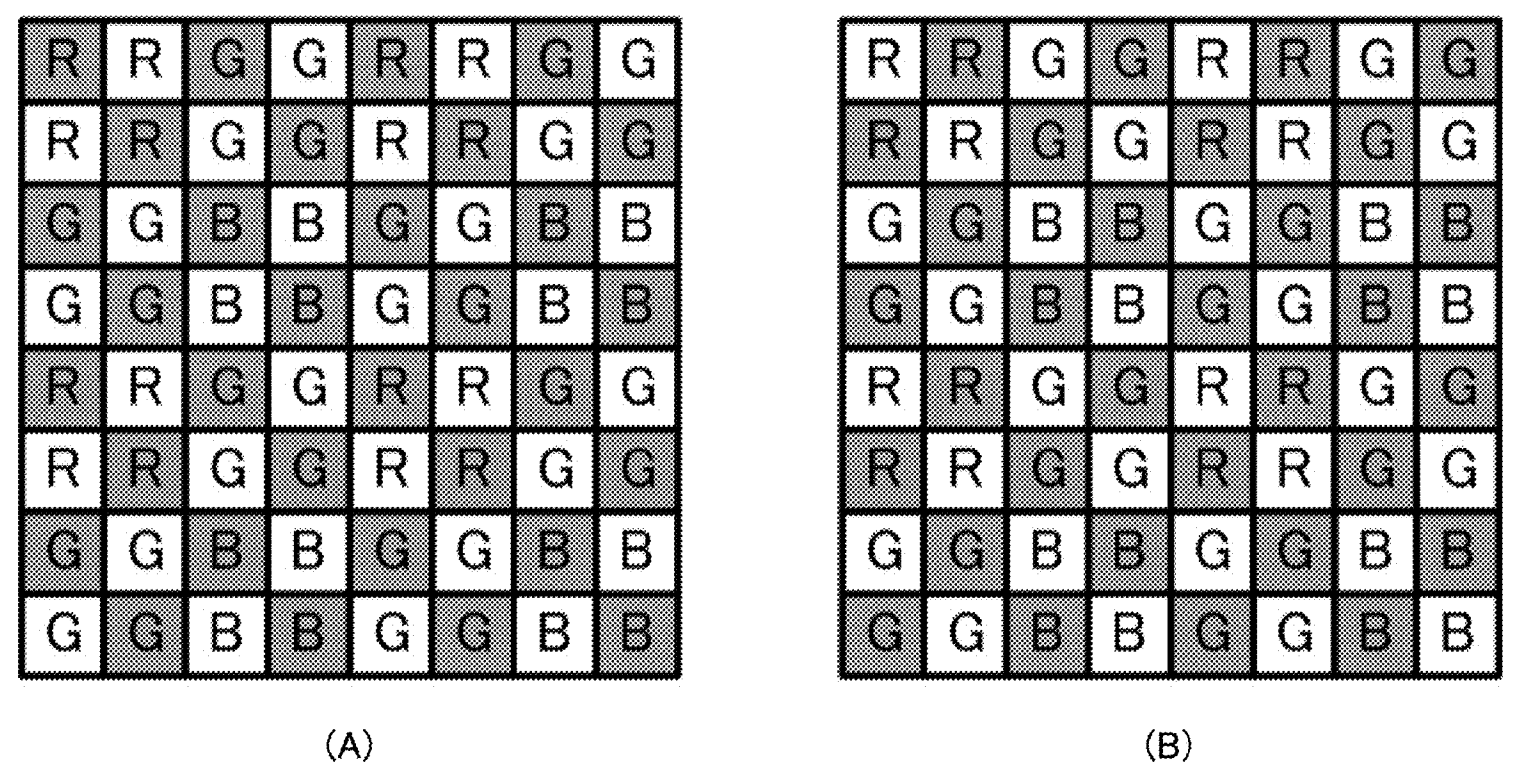
Figure 26C:
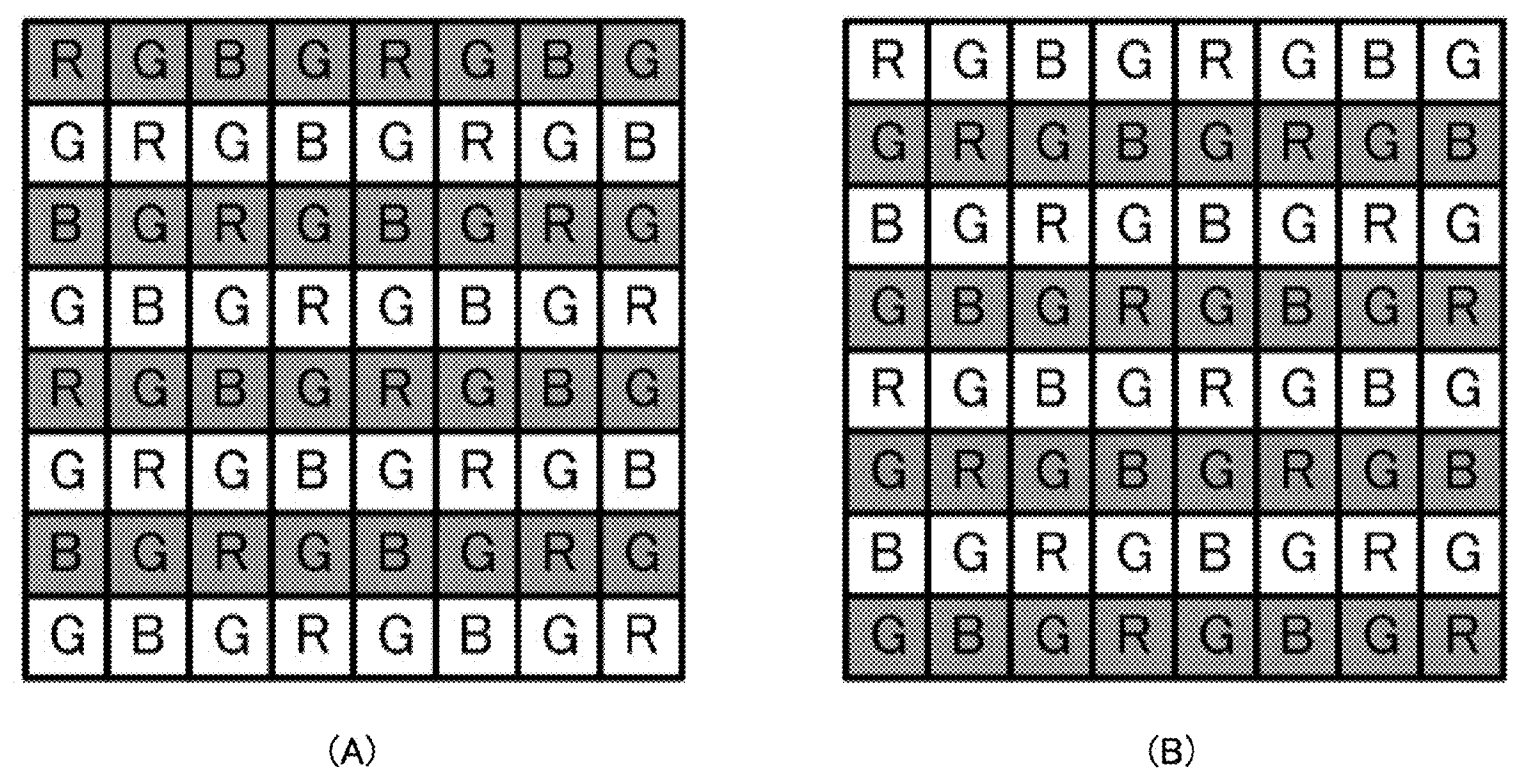

FIG. 27 shows an example configuration of an image processing apparatus when the sensitivities of the image sensor 202 are set in four patterns as shown in FIG. 26. Since pixels with four different sensitivities are set on the image sensor 202, as shown in FIG. 27, image processing is carried out using four images that are consecutively picked up, that is, as shown in FIG. 28, a present time image (t4) 304 picked up at time t4, an earlier time image (t3) 305 picked up at time t3, an earlier time image (t2) 306 picked up at time t2, and an earlier time image (t1) 307 picked up at time t1 using frame memories 301, 302, and 303.

The internal configuration and processing of an HDR image processing unit 308 will now be described with reference to FIG. 28. In an inter-frame interpolation processing unit 311, four consecutively picked-up images 304 to 307 are used to generate four images, that is, a low sensitivity image, a medium-low sensitivity image, a medium-high sensitivity image, and a high sensitivity image. This processing is realized by expanding the process that generates images of two different sensitivities from two consecutively picked-up images described earlier with reference to FIG. 12 to a process that generates images of four different sensitivities using four images.

An intra-frame interpolation processing unit 312 generates four images, that is, a lowest-sensitivity image, a low sensitivity image, a high sensitivity image, and a highest-sensitivity image based on the image in one frame using the present time image (t4) 304. This processing is realized by expanding the process that generates images of two different sensitivities from one picked-up image composed of pixels of two sensitivities described earlier with reference to FIG. 13 to a process that generates images of four different sensitivities using one image composed of pixels of four sensitivities.

An intra-frame interpolation processing unit 313 generates four images, that is, a low sensitivity image, a medium-low sensitivity image, a medium-high sensitivity image, and a high sensitivity image, based on the image in one frame using the earlier time image (t3) 305. This processing is also realized by expanding the process that generates images of two different sensitivities from one picked-up image composed of pixels of two sensitivities described earlier with reference to FIG. 13 to a process that generates images of four different sensitivities using one image composed of pixels of four sensitivities.

Figure 29:
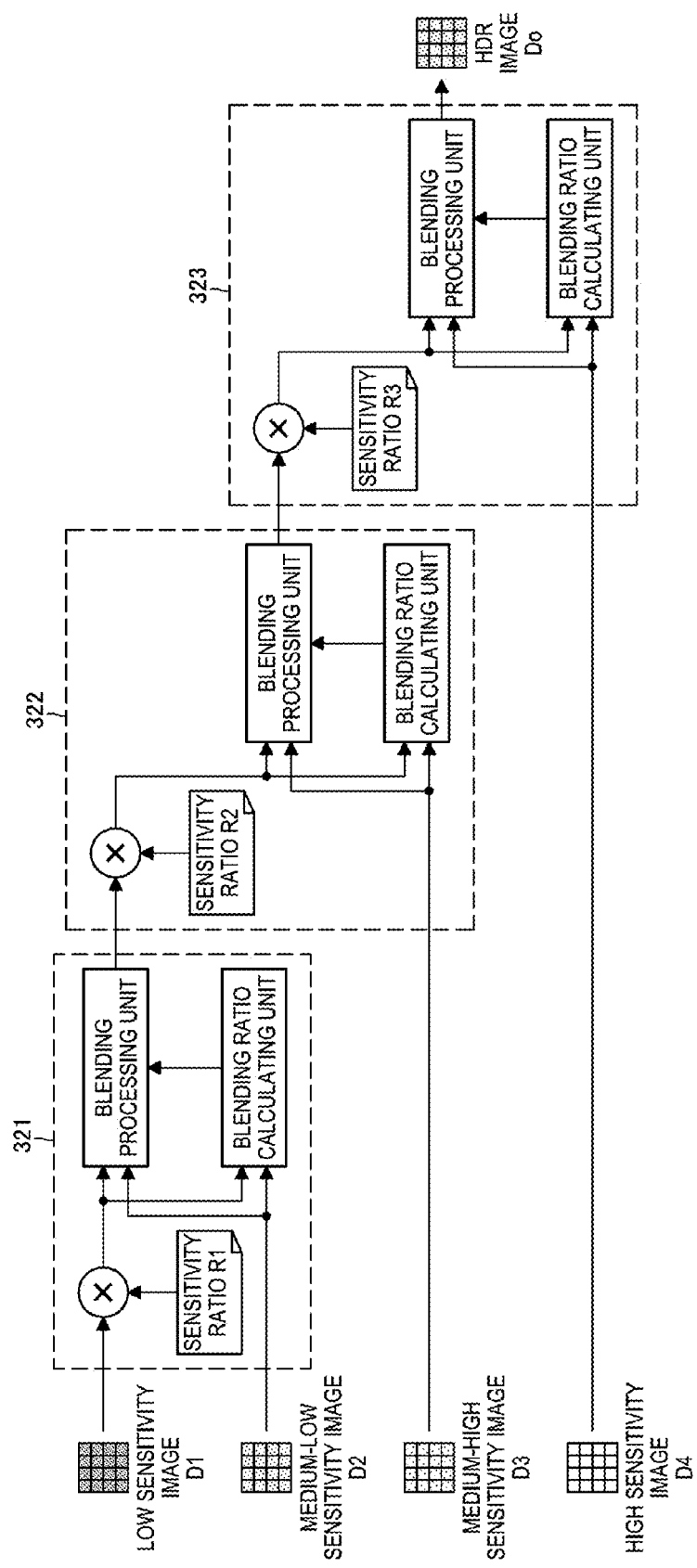
FIG. 29 is a diagram useful in explaining examples of the configuration and processing of an HDR combining processing unit.

The configuration and processing of the HDR combining processing units 314, 315, and 316 will now be described with reference to FIG. 29. As shown in FIG. 29, the HDR combining processing units 314, 315, and 316 carry out processing that generates a single HDR image by a blending process for images of two sensitivities (a low sensitivity image and a high sensitivity image) described earlier with reference to FIG. 15 in multiple stages to finally generate the HDR image Do.

As shown in FIG. 29, first a blending execution unit 321 with the same configuration as that shown in FIG. 15 inputs a low sensitivity image D1 and a medium-low sensitivity image D2 and then the blending execution unit 321 generates a first blended image by carrying out the same blending process as described earlier with reference to FIG. 15.

Next, a blending execution unit 322 with the same configuration as that shown in FIG. 15 inputs the first blended image and a medium-high sensitivity image D3, and then the blending execution unit 322 generates a second blended image by carrying out the same blending process as described earlier with reference to FIG. 15.

After this, a blending execution unit 323 with the same configuration as that shown in FIG. 15 inputs the second blended image and a high sensitivity image D4, and then the blending execution unit 323 generates a third blended image by carrying out the same blending process as described earlier with reference to FIG. 15 to generate the third blended image that is the final HDR image Do.

2-2. Embodiments Where a Frame Memory is Unnecessary

Figure 30:
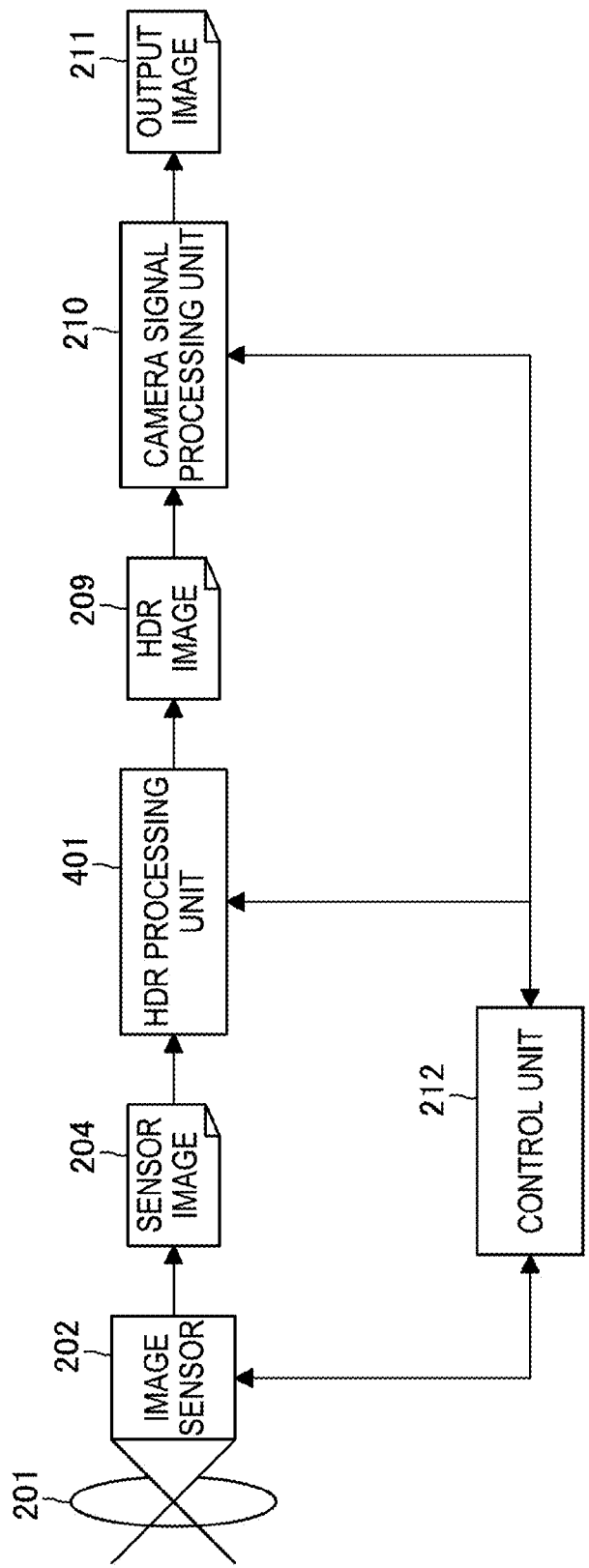
FIG. 30 is a diagram useful in explaining an example configuration of an image processing apparatus.

Next, an embodiment that does not require a frame memory will be described with reference to FIG. 30. The image processing apparatus (image pickup apparatus) shown in FIG. 30 differs to the configuration shown in FIG. 6 in that the frame memory 205 is omitted from the image processing apparatus configuration in FIG. 6 described earlier as the first embodiment and the sensor image 204 that is the output of the image sensor 202 is directly inputted into an HDR processing unit 401.

The control method of the image sensor 202 and a sensor image 203 that is the output image of the image sensor 202 are the same as in the first embodiment described earlier with reference to FIG. 6 onwards. However, this embodiment differs in that processing is carried out for only an image of one frame without using a frame memory. Examples of the configuration and processing of the HDR processing unit 401 according to this embodiment will now be described with reference to FIG. 31.

Figure 31:
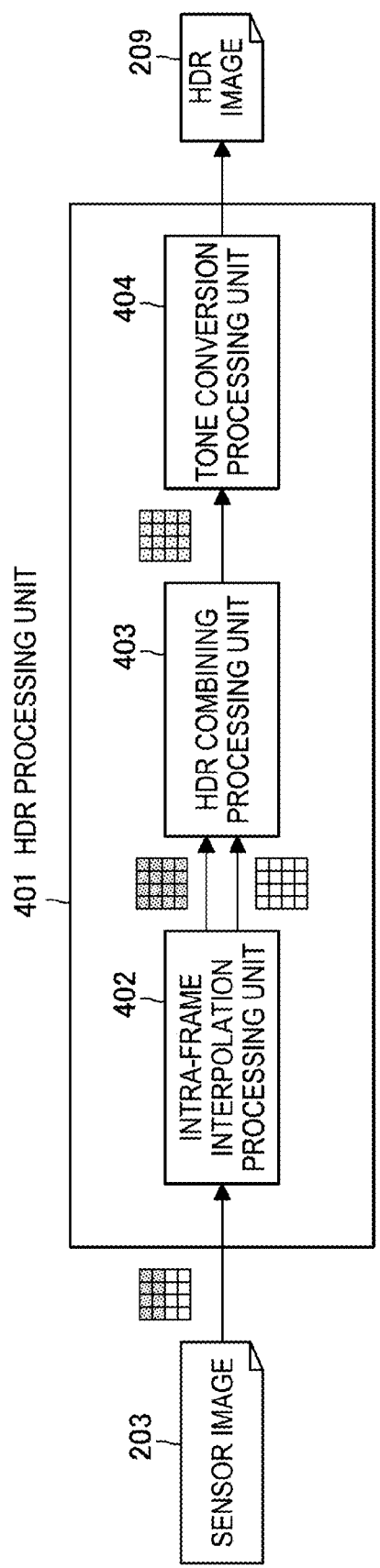
FIG. 31 is a diagram useful in explaining examples of the configuration and processing of an HDR processing unit.

As shown in FIG. 31, the HDR processing unit 401 according to the present embodiment is configured so that an intra-frame interpolation processing unit 402, an HDR combining processing unit 403, and a tone conversion processing unit 404 are connected in that order. The intra-frame interpolation processing unit 402 inputs the sensor image 203 that is the output image of the image sensor 202, generates images with two different sensitivities, that is, a low sensitivity image and a high sensitivity image, by executing an intra-frame interpolation process that is the same as that described earlier with reference to FIG. 13 and outputs the generated images to the HDR combining processing unit 403 located downstream.

The HDR combining processing unit 403 generates an HDR image by carrying out a blending process on the low sensitivity image and the high sensitivity image outputted from the intra-frame interpolation processing unit 402. This processing is the same as the processing described earlier with reference to FIG. 15. The tone conversion processing unit 404 carries out a tone conversion process on the HDR image outputted from the HDR combining processing unit 403. This processing is carried out as the processing that was described earlier with reference to FIG. 18 to set tones that can be processed by a camera signal processing unit located downstream.

This embodiment is a configuration that carries out intra-frame interpolation based on the sensor image 204 that is the output image of the image sensor to generate a low sensitivity image and a high sensitivity image corresponding to each frame without carrying out the inter-frame interpolation process that is carried out in the first embodiment described earlier, and carries out a blending process on the generated images to generate an HDR image.

As a result, the HDR image generated in the present embodiment is an image with a lower resolution than the sensor image 204 outputted from the image sensor 202. However, as described earlier with reference to FIG. 10, for the sensor images outputted by the image sensor 202, the exposure control pattern is switched in frame units so that high sensitivity pixels in a preceding frame are set at low sensitivity pixels in a subsequent frame and low sensitivity pixels in the preceding frame are set at high sensitivity pixels in the subsequent frame. That is, the phase of the image differs in each frame. For this reason, when processing that uses a frame memory is carried out at a camera signal processing unit 253 located downstream, it will be possible to sufficiently restore the resolution at such camera signal processing unit 253. In addition, even if a frame memory is not used in processing downstream, due to the characteristics of human sight, so long as the frame rate is sufficiently high, it will be possible to prevent the drop in resolution from appearing prominent.

2-3. Example Configuration That Carries Out a Pixel Adding Process or a Downsampling Process at Image Sensor Output Next, an example of a configuration that carries out a pixel addition process or a downsampling process at image sensor output will be described.

Recently, the number of pixels provided on image sensors has been increasing rapidly in order to pick up high resolution images. However, due to factors such as the processing performance of the image processing unit located downstream, limits on the image output bandwidth, limits on the speed of an AD converter, and the like, some image sensors are configured to carry out a pixel addition process and/or a downsampling process that do not output the pixel values of all of the pixels of the image sensor but instead drop the resolution and decide and output one pixel value of the output image based on the pixel values of two pixels on the image sensor.

Figure 32:
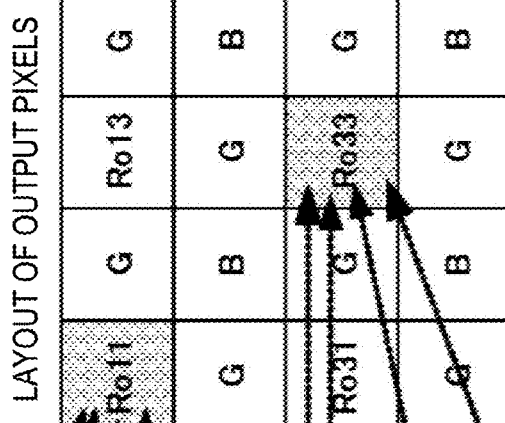
FIGS. 32A and 32B are diagrams useful in explaining an example of a process reducing the number of output pixels of the image sensor.

FIGS. 32A and 32B show an example where one piece of pixel information is generated from four pieces of pixel information on the image sensor, with FIG. 32A showing an example of the layout of image pickup pixels and FIG. 32B showing an example of the layout of output pixels. The image picked-up by the image sensor has the layout of image pickup pixels shown in FIG. 32A, but when outputting such image from the image sensor to a processing unit located downstream, the number of pixels is reduced and the output pixel layout shown in FIG. 32B is set. In this example, a process that reduces the number of pixels to one quarter by reducing 8×8 pixels to 4×4 pixels is carried out.

Methods of reducing the number of pixels in this way include pixel downsampling and pixel addition. When pixel downsampling is carried out, as one example the output pixel value is decided as shown below for the output pixel Ro11 in the upper left corner of the output pixel layout shown in FIG. 32B. Note that in the expression "Ro11", "R" is the color of the pixel, "o" indicates "output", and "11" is the coordinate position (x, y)=(1,1). For the output pixel Ro11 in the upper left corner of the output pixel layout shown in FIG. 32B, only one R pixel is selected from the four R pixels included in a 4×4 pixel region in the upper left corner of the layout of image pickup pixels shown in FIG. 32A, so that Ro11=R11. In this way, only one pixel output included in the corresponding pixel positions (the 4×4 pixel region) of the layout of image pickup pixels shown in FIG. 32A is used to set the output pixel value Ro11.

When a pixel addition process is carried out, a weighted average is outputted based on four R pixels included in the 4×4 pixel region in the top left corner of the layout of image pickup pixels shown in FIG. 32A as shown by the equation below.

$$Ro11 = a \times R11 + b \times R13 + c \times R31 + d \times R33$$

Here, a, b, c, and d are weightings that are decided in advance and as one example are set with consideration to the distance to the output pixel position, edge directions, and the like. FIG. 33 shows an example where pixel addition has been carried out between pixels of the same sensitivity. The example of an output pixel layout produced here by pixel addition is the same as the layout described earlier with reference to FIGS. 9A and 9B where short exposure pixels and long exposure pixels are set in units of two lines, and can be subjected to image processing with the same configuration as FIG. 6 described earlier.

Note that as the specific configuration that reduces the number of pixels of the image picked up by the image sensor, as one example it is possible to use a configuration that selects one pixel from a plurality of pixels at an AD conversion unit of the image pickup element. One example of such a configuration is described in Satoshi Yoshihara et al. "1/1.8-inch 6.4 MPixel 60 frames/s CMOS Image Sensor with Seamless Mode Change", 2006 IEEE International Solid-State Circuits Conference, pp. 492-493 (2006).

The AD conversion circuit is configured to convert the output values of the respective pixels of the image sensor to digital values, to alternately read out a plurality of pixels of the image sensor, and to refer to the pixel values and select one of the pixel values as an output value.

The image processing apparatus according to the present disclosure can also be applied to an image pickup apparatus with a configuration that uses information on a plurality of pixels in this way to output information on one pixel.

Figure 35:
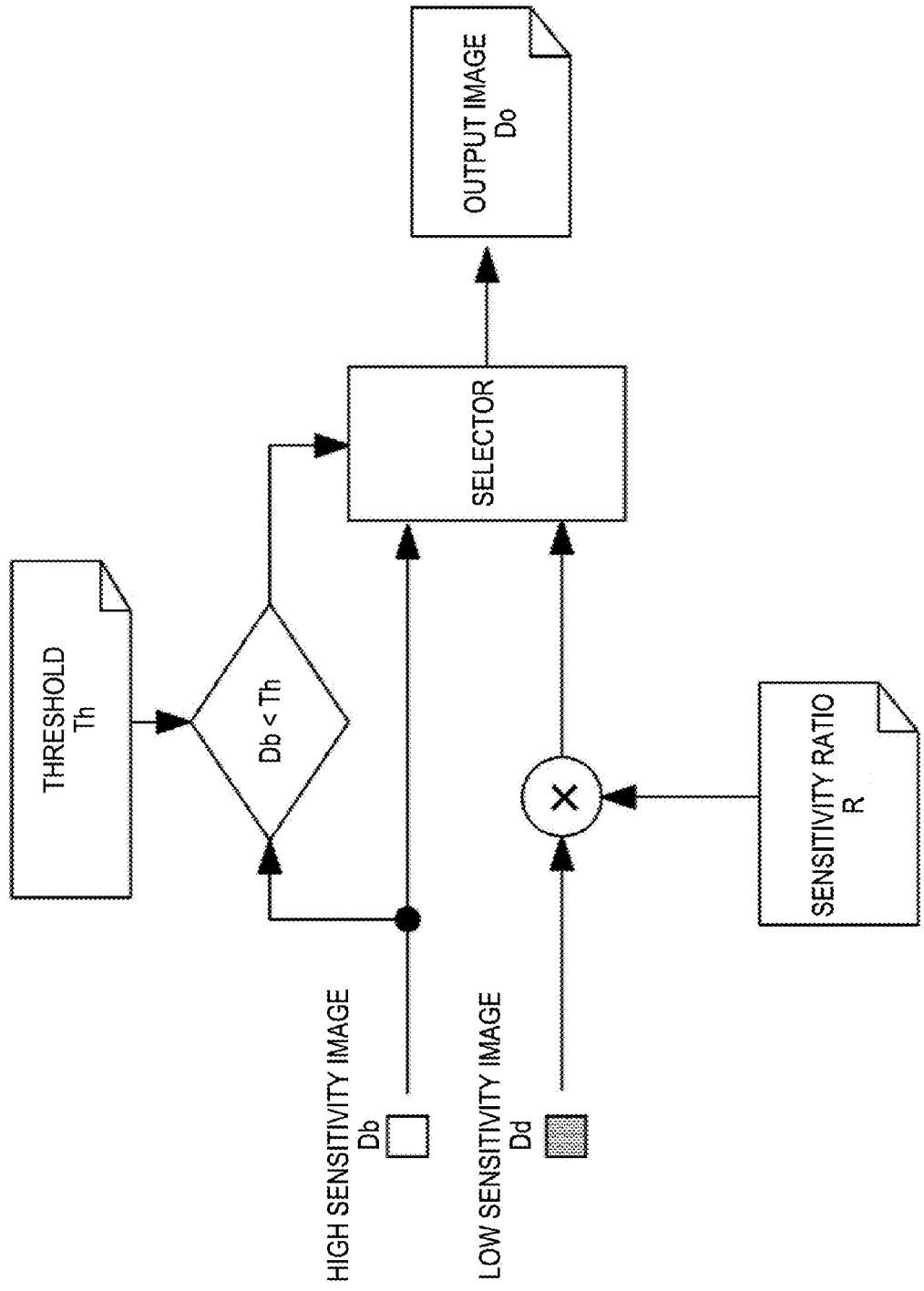
FIG. 35 is a diagram useful in explaining an example of a process reducing the number of output pixels of the image sensor.

An example of how an image sensor that selectively outputs one out of a plurality of pixels is driven will be described with reference to FIGS. 34A to 35. As shown in FIGS. 34A and 34B, a vertical scanning circuit reads out pixels with different sensitivities in two read operations. First, a high sensitivity pixel 421 is read out and then a low sensitivity pixel 422 is read out. After this, as shown in FIG. 35, one of the pixels that have been read out, i.e., the high sensitivity pixel Db and the low sensitivity pixel Dd is selectively outputted. More specifically, the high sensitivity pixel Db is compared with a threshold Th set in advance and when the pixel value of the high sensitivity pixel Db is below the threshold Th, a selector selectively outputs the high sensitivity pixel Db. Conversely, when the high sensitivity pixel Db is equal to or larger than the threshold Th, the selector selectively outputs a pixel value produced by multiplying the low sensitivity pixel Dd by a sensitivity ratio R.

With the configuration shown in FIG. 35, if a high sensitivity pixel is expressed as Db, a low sensitivity pixel as Dd, and an output pixel as Do, when Db is lower than Th, Do is set so that Do=Db, and in other cases, Do is set so that Do=Dd×R to generate the HDR image from the sensor output image.

An example will now be described where this reading method is used in combination with the HDR image generating method according to the present disclosure. With the method shown in FIG. 35, when the scene is dark, only the high sensitivity pixels are used and outputted, while when the scene is bright, only the low sensitivity pixels are used and outputted.

Figure 36:
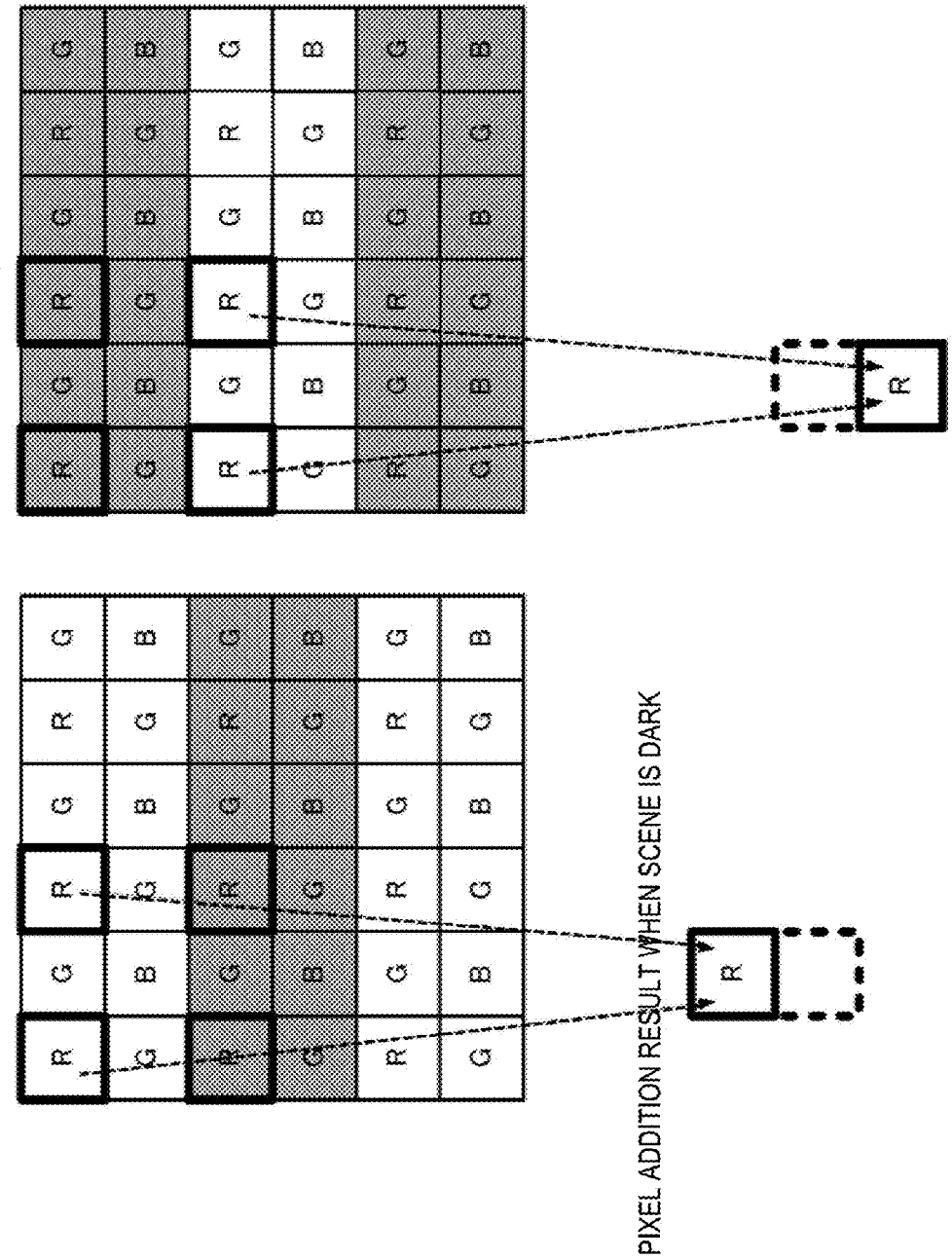
FIG. 36 is a diagram useful in explaining an example of a process reducing the number of output pixels of the image sensor.

As one example, with a configuration that carries out control over the layout of image pickup pixels on the image sensor to spatially and temporally change the sensitivities of the pixels between Arrangement 1 and Arrangement 2 shown in FIG. 36 in consecutively picked-up images, when a scene is dark, pixel values of the pixels that compose the output pixel layout are set by carrying out pixel addition using only the high sensitivity pixels. In this case, the output HDR image is outputted with a phase that is shifted with respect to the output of the image sensor.

Figure 37:
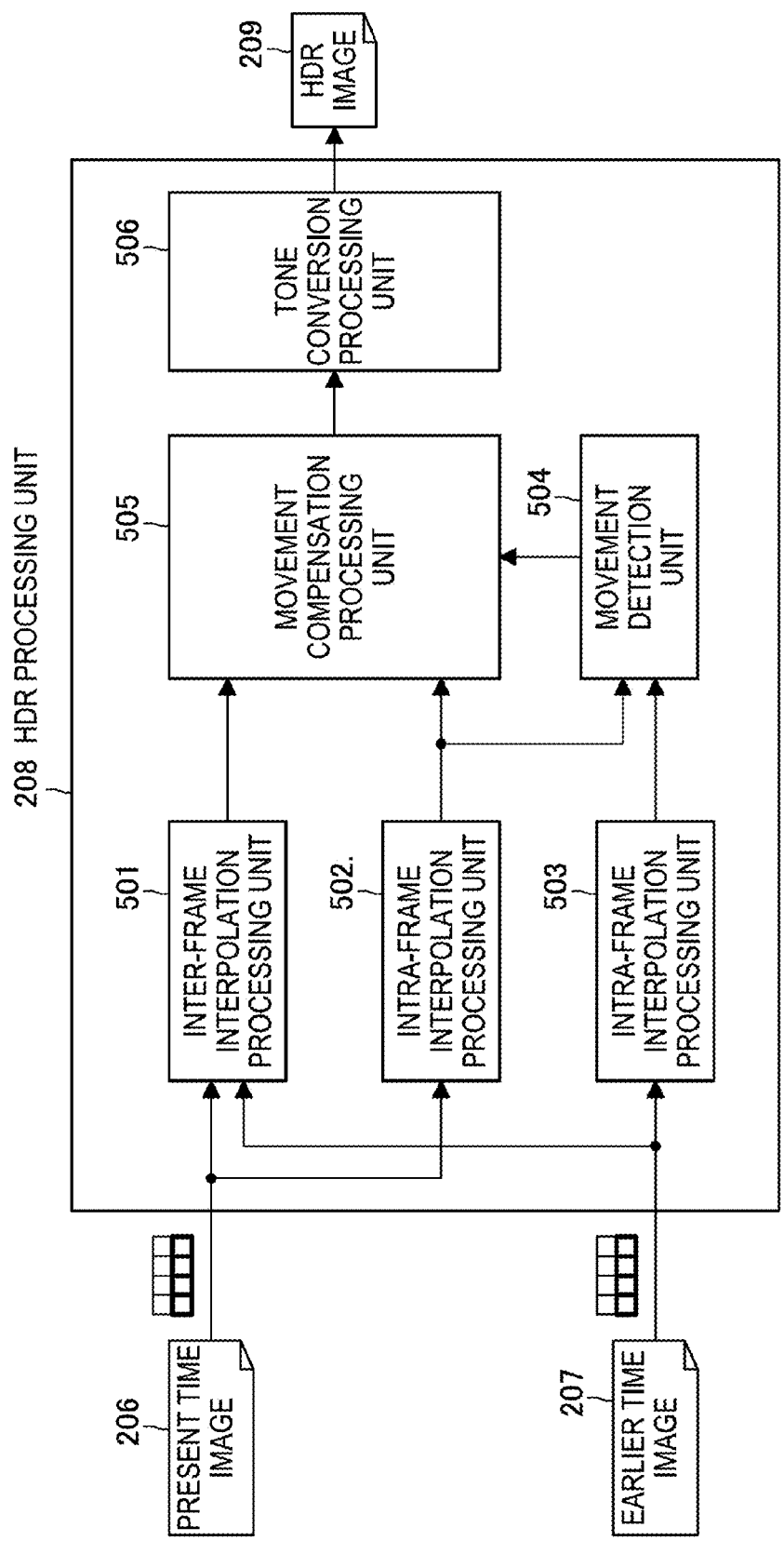
FIG. 37 is a diagram useful in explaining examples of the construction and processing of an HDR processing unit.

FIG. 37 shows examples of the configuration and processing of an HDR processing unit that uses the method shown in FIG. 35, i.e., is configured to output using only high sensitivity pixels when the scene is dark and to output using only low sensitivity pixels when the scene is bright.

The HDR processing unit 208 shown in FIG. 37 has a configuration that omits the HDR combining processing units 254 to 256 included in the HDR processing unit 208 described earlier with reference to FIG. 11. With the configuration shown in FIG. 37, a selection process that selects an optimal pixel value in keeping with the brightness of the pixel is carried out when a value has already been inputted from an image sensor into the HDR processing unit 208. By carrying out this processing, it is possible to omit the processing of the HDR combining processing units 254 to 256 shown in FIG. 11.

FIG. 38 is a diagram useful in explaining the processing of an inter-frame interpolation processing unit 501. The inter-frame interpolation processing unit 501 inputs the present time image 206 and the earlier time image 207 and generates one image based on the two images. As one example, the present time image 206 and the earlier time image 207 are both images set from the high sensitivity pixels and are images in which pixel values of the low sensitivity pixel positions are not obtained. The inter-frame interpolation processing unit 501 generates an interpolated image in which the pixel values of the low sensitivity pixel positions are calculated by an interpolation process carried out on the present time image 206 and the earlier time image 207.

Figure 39:
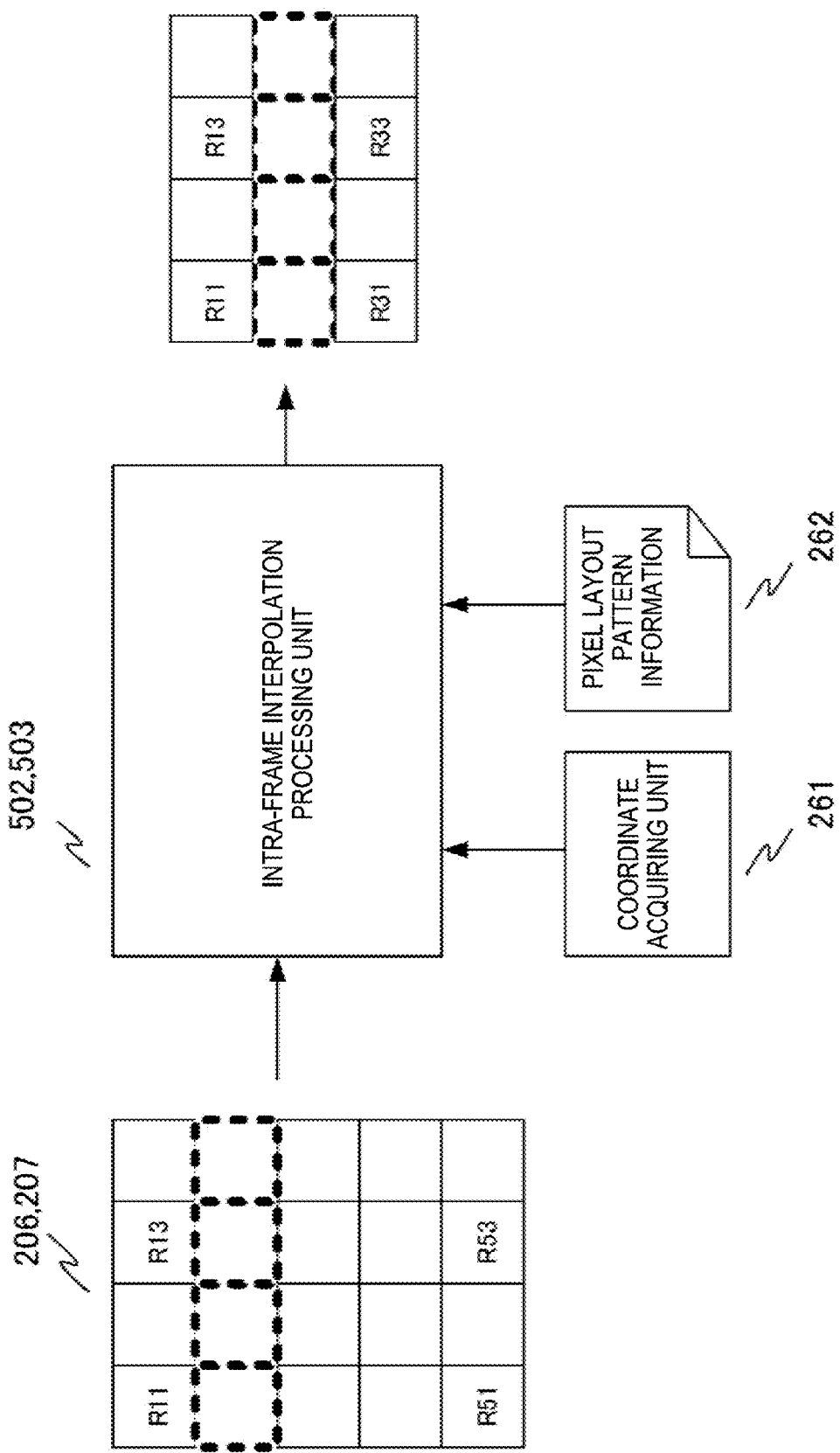
FIG. 39 is a diagram useful in explaining examples of the configuration and processing of an intra-frame interpolation processing unit.

FIG. 39 is a diagram useful in explaining the processing of intra-frame interpolation processing units 502, 503. The intra-frame interpolation processing units 502, 503 input the present time image 206 or the earlier time image 207 and each generate one interpolated image based on one of such images. As one example, the present time image 206 and the earlier time image 207 are both images set from the high sensitivity pixels and are images in which pixel values of the low sensitivity pixel positions are not obtained. The intra-frame interpolation processing units 502, 503 generate interpolated images in which the pixel values of the low sensitivity pixel positions are calculated by an interpolation process carried out on the present time image 206 or the earlier time image 207.

The processing of a movement compensation processing unit 505 and a tone conversion processing unit 506 shown in FIG. 37 is the same as the processing described earlier as the first embodiment. In this embodiment also, a high-resolution image that follows movement and has improved resolution is generated by carrying out a temporal and spatial interpolation process that was described earlier with reference to FIGS. 12 and 13 in the first embodiment.

Note that although processing by a configuration that uses and outputs only high sensitivity pixels when a scene is dark and uses and outputs only low sensitivity pixels when a scene is bright has been described in the above example, a resolution increasing process where the HDR processing unit 208 shown in FIG. 37 is applied to a configuration that sets one output pixel value from both high sensitivity pixels and low sensitivity pixels is also possible.

Figure 40:
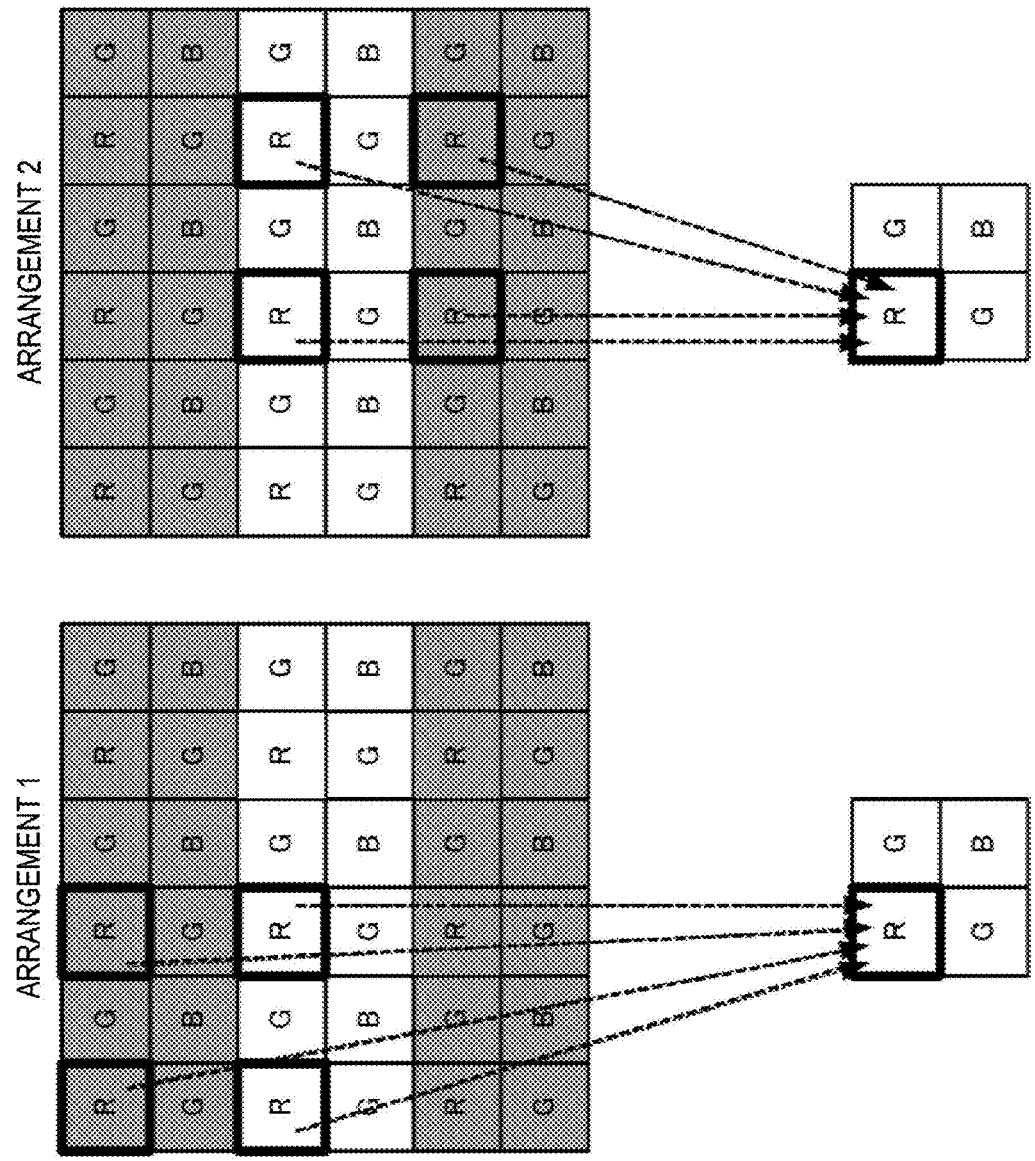
FIG. 40 is a diagram useful in explaining an example of exposure control of an image sensor.

More specifically, a resolution increasing process where the HDR processing unit 208 shown in FIG. 37 is applied to a configuration that sets one output pixel value from both high sensitivity pixels and low sensitivity pixels as shown in FIG. 40 or 41 as the output configuration of an image sensor that reduces the number of pixels is also possible.

The example shown in FIG. 40 is an example of exposure control where Arrangement 1 is set for a preceding picked-up image and Arrangement 2 is set for a subsequent picked-up image at a later timing and shows an example of exposure control where the sensitivity of pixels is spatially changed but the sensitivity is not temporally changed.

With this configuration, the reference pixel positions are temporally changed for pixels composing an output (i.e., the input into the HDR processing unit) that has been subjected to a reduction in the number of pixels.

FIG. 41 is a method where the sensitivity of the pixels is spatially and temporally changed and additionally where the plurality of pixels referred to when outputting the pixel information of one pixel are switched in the same way as in FIG. 40. By inputting an image that has been processed to reduce the number of pixels into the HDR processing unit 208 shown in FIG. 37 and carrying out the processing described earlier, it is possible to generate and output an HDR image.

Figure 2:
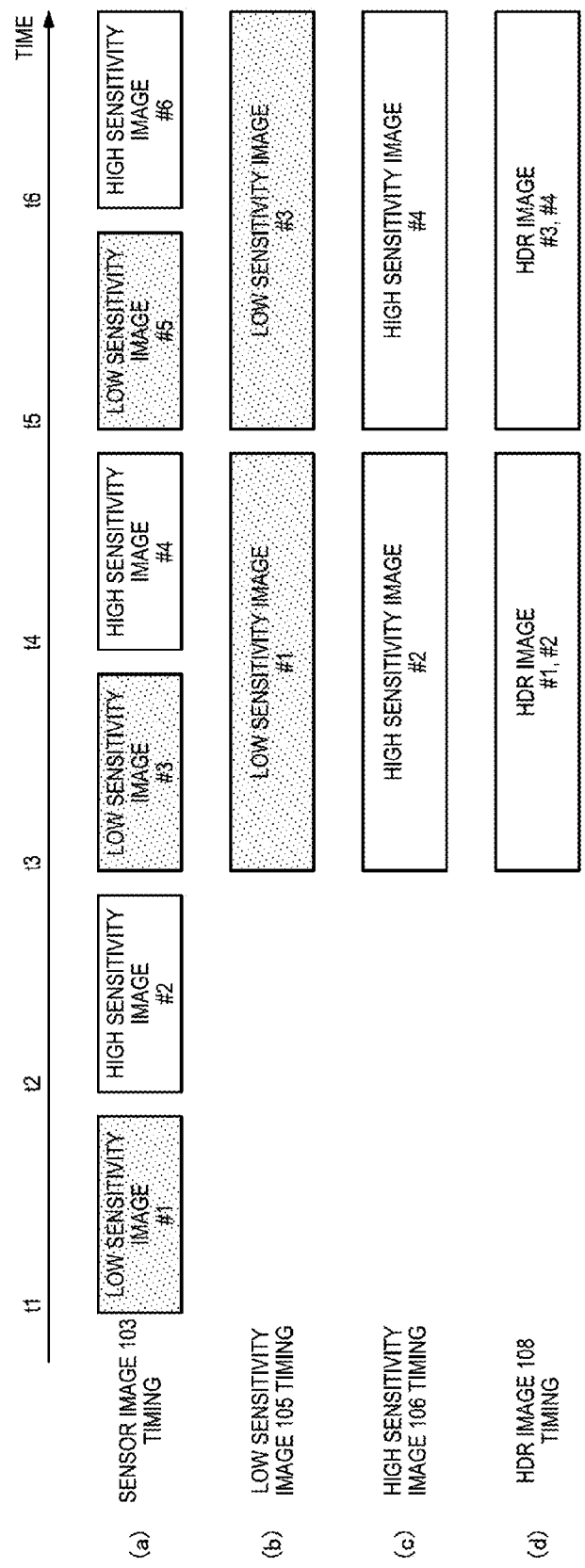
FIG. 2 is a diagram useful in explaining example processing of the image pickup apparatus that obtains an HDR image.

3. Comparison Between Image Processing Apparatus According to the Present Disclosure and an Existing Configuration Next, the effect of the image processing apparatus according to the present disclosure will be described by comparing the processing of the image processing apparatus according to the present disclosure described earlier with the processing of a conventional configuration. The method described earlier with reference to FIGS. 1 and 2 is one example of a conventional technology for realizing HDR image pickup. Since this conventional method generates one image using two images, there is the problem that the frame rate is half the sensor output. In addition, the memory usage bandwidth for generating one HDR image is two write frames and two read frames in the frame memory.

On the other hand, the image processing apparatus according to the present disclosure, that is, the configuration described earlier with reference to FIGS. 6 to 10, has an advantage in that it is possible to set the frame rate of the outputted HDR images equal to the frame rate of the sensor. In addition, the usage bandwidth of the frame memory for generating one HDR image is one write frame and one read frame, which means that compared to the conventional method, there is the advantage of using only half the memory bandwidth.

Figure 3:
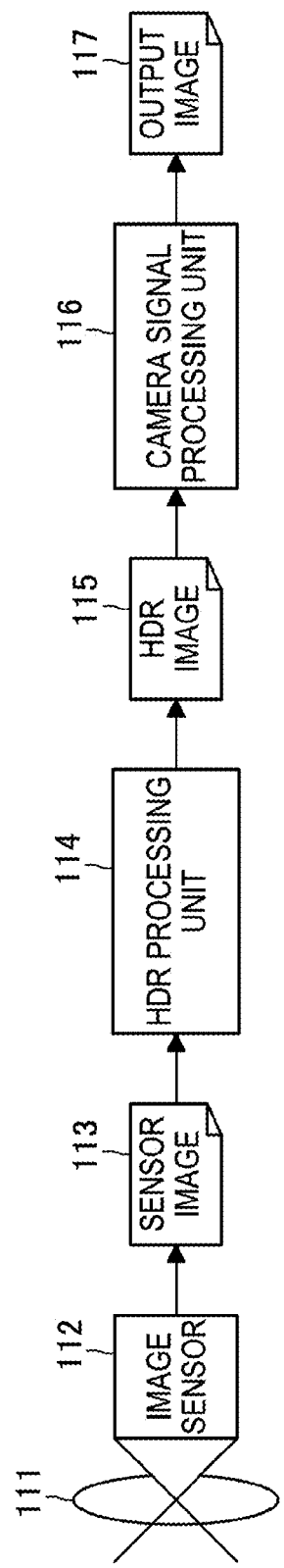
FIG. 3 is a diagram useful in explaining an example configuration of another image pickup apparatus that obtains an HDR image.
Figure 5:
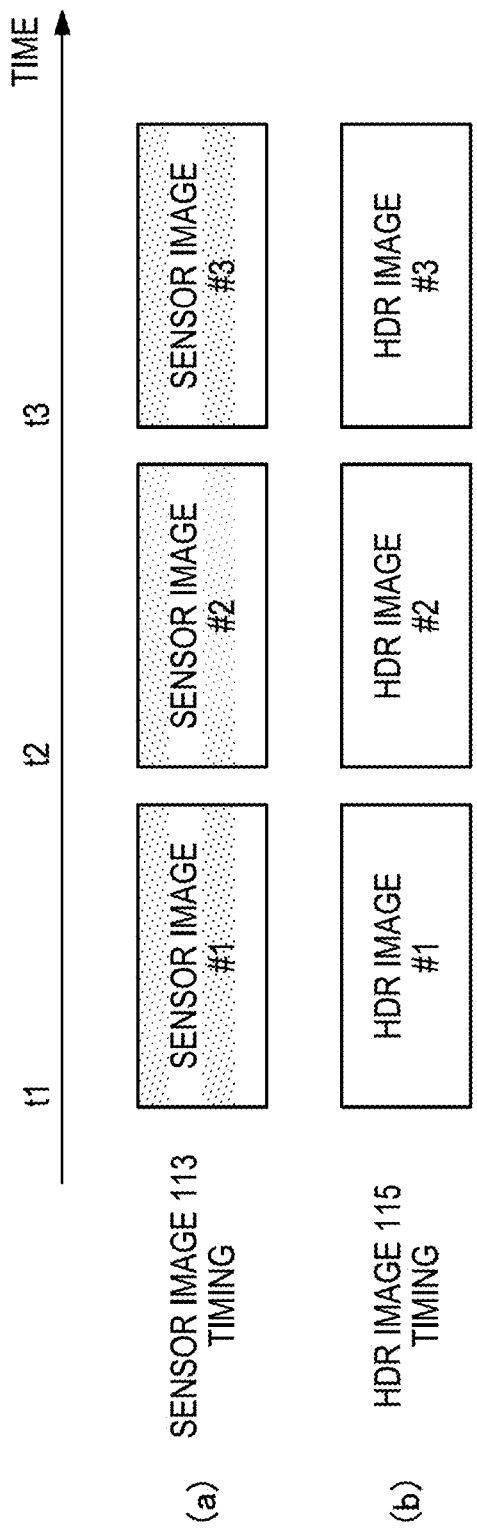
FIG. 5 is a diagram useful in explaining an example of processing of the other image pickup apparatus that obtains an HDR image.

Another example of a conventional technology for realizing HDR image pickup was described earlier with reference to FIGS. 3 to 5. This method uses information on pixels with different sensitivities set in a single image. The problem with this method is that as described earlier, there is a drop in resolution.

Figure 12:
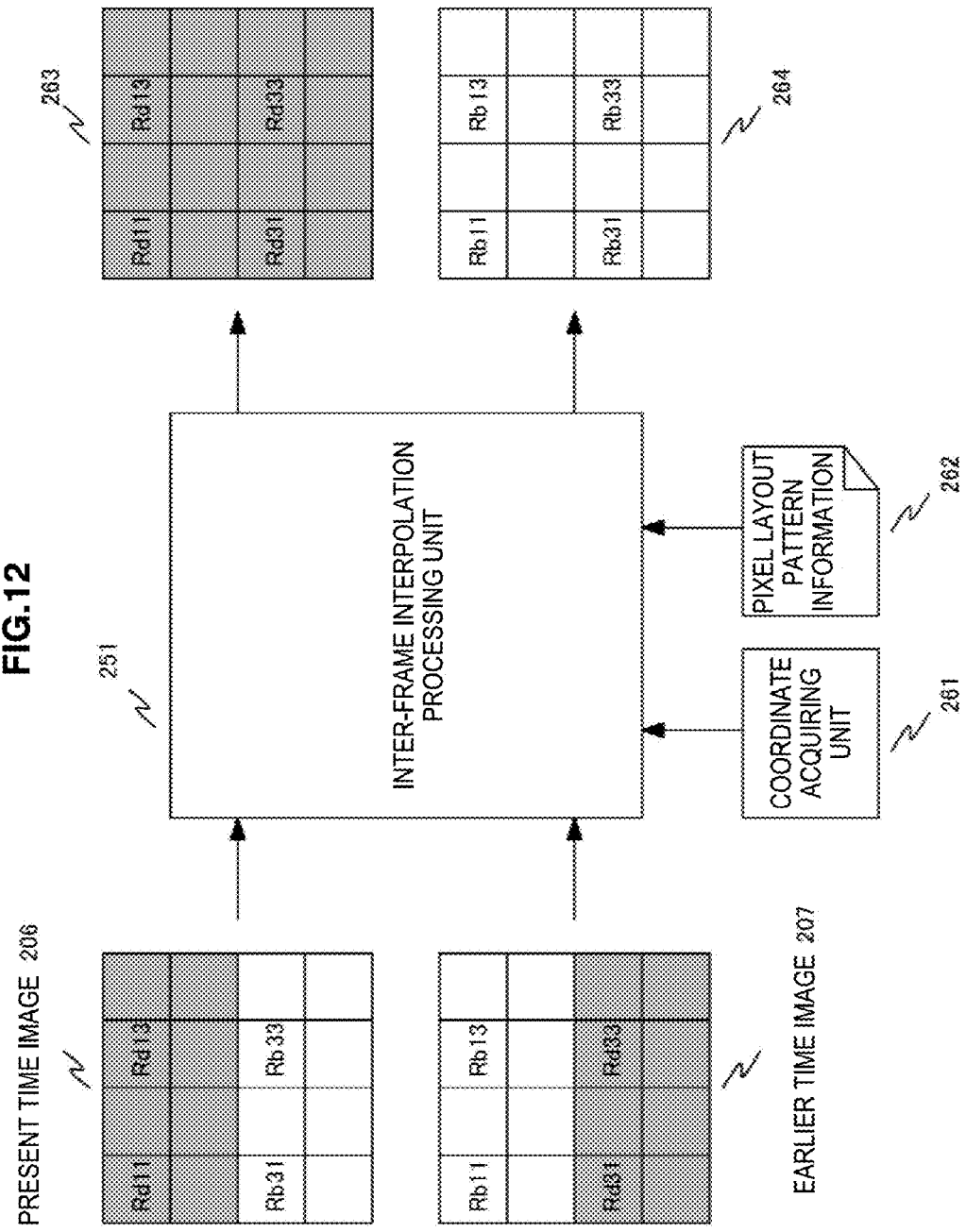
FIG. 12 is a diagram useful in explaining examples of the configuration and processing of an inter-frame interpolation processing unit.

On the other hand, the image processing apparatus according to the present disclosure has a configuration that carries out an inter-frame interpolation process such as that shown in FIG. 12 to generate generation information for an HDR image that uses a plurality of consecutively picked-up images with different exposure patterns, and, by using actual pixel values of consecutively picked-up images, is capable, for at least still images, of realizing the same high resolution as the Bayer pattern that is the image sensor output during image pickup.

4. Conclusion

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An image processing apparatus comprising:

an HDR (High Dynamic Range) processing unit inputting images that have been picked up while exposure control that changes an exposure time is being carried out with a predetermined spatial period and a predetermined temporal period on pixels that compose an image sensor, and carrying out image processing, wherein the HDR processing unit:

generates a first combined image by combining pixel values of a plurality of images with different sensitivities generated by an interpolation process using a plurality of images that have been picked up consecutively;

generates a second combined image by combining pixel values of a plurality of images with different sensitivities generated by an interpolation process that uses a single picked-up image; and generates an HDR (high dynamic range) image by executing a pixel value blending process on the first combined image and the second combined image in accordance with a blending ratio calculated in accordance with movement detection information.

(2)

The image processing apparatus according to (1) or (2), wherein the HDR processing unit generates the HDR image by executing the pixel value blending process where the blending ratio of the second combined image is raised for a pixel position where the movement detection information shows that there has been movement and the blending ratio of the first combined image is raised for a pixel position where the movement detection information shows that there has been no movement.

(3)

The image processing apparatus according to (1) or (2), wherein the HDR processing unit includes an inter-frame interpolation processing unit generating a plurality of images of different sensitivities by using, without amendment, a plurality of pixels of different sensitivities present in a plurality of images that were picked up consecutively, and the HDR processing unit generates the first combined image by combining pixel values of the plurality of images of different sensitivities generated by the inter-frame interpolation processing unit.

(4)

The image processing apparatus according to any one of (1) to (3), further including:

a movement detecting unit generating the movement detection information by comparing pixel values of corresponding pixels in images picked up at different times and carrying out movement detection in pixel units; and a movement compensation processing unit generating a HDR image by executing a pixel value blending process for the first combined image and the second combined image in accordance with a blending ratio calculated in accordance with the movement detection information.

(5)

The image processing apparatus according to any one of (1) to (4), wherein the movement detecting unit generates the movement detection information by carrying out movement detection in pixel units based on an image comparison of the second combined image generated by combining pixel values of a plurality of images of different sensitivities generated by an interpolation process that uses only a present time image that is a latest image out of a plurality of images picked up consecutively, and a third combined image generated by combining pixel values of a plurality of images of different sensitivities generated by an interpolation process that uses only an earlier time image that is an image picked up before the latest image out of the plurality of images picked up consecutively.

(6)

An image processing apparatus according to any one of (1) to (5), further comprising a tone conversion processing unit inputting the HDR image generated by the HDR processing unit and reducing the number of bits of pixel values in the HDR image.

A series of processes described in this specification can be executed by any of hardware, software, or both. When a process is executed by software, a program having a processing sequence recorded thereon can be executed by being installed on memory in a computer built in dedicated hardware, or executed by being installed on a general-purpose computer that can execute various processes. For example, the program can be recorded on a recording medium in advance. The program can be installed from the recording medium to the computer, or be received via a network such as a LAN (Local Area Network), or the Internet, and be installed on a recording medium such as built-in hardware.

Note that each of the processes described in the specification need not be executed in a time-series order in accordance with the description, and may be executed in parallel or individually in accordance with the processing capacity of the device that executes the process or according to need. In addition, the system in this specification is a logical collection configuration of a plurality of devices, and need not be the one in which a device with each configuration is accommodated within a single housing.

As described above, according to an embodiment of the present disclosure, an apparatus and method that generate a high-quality, high dynamic range image based on picked-up images is realized.

Specifically, an image processing (HDR processing) unit inputting images that have been picked up while exposure control that changes an exposure time is being carried out with a predetermined spatial period and a predetermined temporal period on pixels that compose an image sensor and carrying out image processing is included. The image processing unit generates a plurality of images with different sensitivities by an interpolation process using a plurality of images that have been picked up consecutively and generates a first combined image by combining the plurality of generated images with different sensitivities and generates a plurality of images with different sensitivities generated by an interpolation process on a single picked-up image and generates a second combined image by combining the plurality of generated images with different sensitivities. In addition, an HDR image is generated by blending pixel values of a first combined image and a second combined image in accordance with a blending ratio calculated in accordance with the movement detection information. By carrying out such processing, an HDR image in which deterioration in resolution is minimized is generated.

The present disclosure contains subject matter related to that disclosed in Japanese Priority Patent Application JP 2011-108047 filed in the Japan Patent Office on May 13, 2011, the entire content of which is hereby incorporated by reference.

What is claimed is:

1. An image processing apparatus comprising:
an HDR (High Dynamic Range) processing unit inputting images that have been picked up while exposure control that changes an exposure time is being carried out with a predetermined spatial period and a predetermined temporal period on pixels that compose an image sensor, and carrying out image processing,
wherein the HDR processing unit:
generates a first combined image by combining pixel values of a plurality of images with different sensitivities generated by an interpolation process using a plurality of images that have been picked up consecutively;
generates a second combined image by combining pixel values of a plurality of images with different sensitivities generated by an interpolation process that uses a single picked-up image; and
generates an HDR (high dynamic range) image by executing a pixel value blending process on the first combined image and the second combined image in accordance with a blending ratio calculated in accordance with movement detection information
wherein the HDR processing unit generates the HDR image by executing the pixel value blending process where the blending ratio of the second combined image is raised for a pixel position where the movement detection information shows that there has been movement and the blending ratio of the first combined image is raised for a pixel position where the movement detection information shows that there has been no movement.

2. The image processing apparatus according to claim 1,
wherein the HDR processing unit includes an inter-frame interpolation processing unit generating a plurality of images of different sensitivities by using, without amendment, a plurality of pixels of different sensitivities present in a plurality of images that were picked up consecutively, and
the HDR processing unit generates the first combined image by combining pixel values of the plurality of images of different sensitivities generated by the inter-frame interpolation processing unit.

3. The image processing apparatus according to claim 1, further comprising:
a movement detecting unit generating the movement detection information by comparing pixel values of corresponding pixels in images picked up at different times and carrying out movement detection in pixel units; and
a movement compensation processing unit generating a HDR image by executing a pixel value blending process for the first combined image and the second combined image in accordance with a blending ratio calculated in accordance with the movement detection information.

4. The image processing apparatus according to claim 3,
wherein the movement detecting unit generates the movement detection information by carrying out movement detection in pixel units based on an image comparison of
the second combined image generated by combining pixel values of a plurality of images of different sensitivities generated by an interpolation process that uses only a present time image that is a latest image out of a plurality of images picked up consecutively, and
a third combined image generated by combining pixel values of a plurality of images of different sensitivities generated by an interpolation process that uses only an earlier time image that is an image picked up before the latest image out of the plurality of images picked up consecutively.

5. An image processing apparatus according to claim 1, further comprising a tone conversion processing unit inputting the HDR image generated by the HDR processing unit and reducing the number of bits of pixel values in the HDR image.

6. An image processing apparatus comprising:
an HDR (High Dynamic Range) processing unit inputting images that have been picked up while exposure control that changes an exposure time is being carried out with a predetermined spatial period and a predetermined temporal period on pixels that compose an image sensor, and carrying out image processing,
wherein the HDR processing unit includes:
an intra-frame interpolation processing unit generating a plurality of images of different sensitivities by carrying out an interpolation process that uses a single picked-up image; and
an HDR combining processing unit generating an HDR image by carrying out a combining process for the plurality of images of different sensitivities generated by the intra-frame interpolation processing unit.

7. An image pickup apparatus comprising:
an image sensor;
a control unit carrying out exposure control that changes an exposure time with a predetermined spatial period and a predetermined temporal period on pixels that compose the image sensor; and an HDR (high dynamic range) processing unit inputting an image picked up by the image sensor and carrying out image processing, wherein the HDR processing unit:

generates a first combined image by combining pixel values of a plurality of images with different sensitivities generated by an interpolation process that uses a plurality of images that have been picked up consecutively;

generates a second combined image by combining pixel values of a plurality of images with different sensitivities generated by an interpolation process that uses a single picked-up image; and generates an HDR (high dynamic range) image by executing a pixel value blending process on the first combined image and the second combined image in accordance with a blending ratio calculated in accordance with movement detection information;

wherein the control unit carries out control over the exposure time in line units for the image sensor and carries out different exposure control in units of picked-up image frames.

8. The image pickup apparatus according to claim 7, wherein the control unit carries out control over the exposure time in line units by controlling line reset timing as a charge accumulation start time for the pixels that compose the image sensor.

9. The image pickup apparatus according to claim 7, wherein the image pickup apparatus generates the HDR image by carrying out a pixel number reduction process to produce an image with a lower number of pixels than a number of pixels that compose the image sensor and outputting the image produced by the pixel number reduction process to the HDR processing unit.

10. A program, stored/recorded in a non-transitory computer readable medium, causing an image processing apparatus to carry out image processing, comprising:

image processing carried out by an HDR (High Dynamic Range) processing unit that inputs images that have been picked up while exposure control that changes an exposure time is being carried out with a predetermined spatial period and a predetermined temporal period on pixels that compose an image sensor, wherein the image processing step:

generates a first combined image by combining pixel values of a plurality of images with different sensitivities generated by an interpolation process using a plurality of images that have been picked up consecutively;

generates a second combined image by combining pixel values of a plurality of images with different sensitivities generated by an interpolation process that uses a single picked-up image; and generates an HDR (high dynamic range) image by executing a pixel value blending process on the first combined image and the second combined image in accordance with a blending ratio calculated in accordance with movement detection information.

\* \* \* \* \*